(12) United States Patent
Shabtay et al.

(10) Patent No.: US 12,392,999 B2
(45) Date of Patent: *Aug. 19, 2025

(54) FOLDED CAMERA LENS DESIGNS INCLUDING EIGHT LENSES OF +-+-+++-REFRACTIVE POWERS

(71) Applicant: Corephotonics Ltd., Tel Aviv (IL)

(72) Inventors: Gal Shabtay, Tel Aviv (IL); Ephraim Goldenberg, Tel Aviv (IL); Roy Rudnick, Tel Aviv (IL); Nadav Goulinski, Tel Aviv (IL)

(73) Assignee: Corephotonics Ltd., Tel Aviv (IL)

( * ) Notice: Subject to any disclaimer, the term of this patent is extended or adjusted under 35 U.S.C. 154(b) by 0 days.

This patent is subject to a terminal disclaimer.

(21) Appl. No.: 18/755,732

(22) Filed: Jun. 27, 2024

(65) Prior Publication Data

US 2024/0345372 A1  Oct. 17, 2024

Related U.S. Application Data

(63) Continuation of application No. 17/607,400, filed as application No. PCT/IB2021/056357 on Jul. 14, 2021, now Pat. No. 12,050,308.

(60) Provisional application No. 63/054,862, filed on Jul. 22, 2020.

(51) Int. Cl.
*G02B 13/00* (2006.01)
*G02B 9/64* (2006.01)

(52) U.S. Cl.
CPC .......... *G02B 13/0065* (2013.01); *G02B 9/64* (2013.01); *G02B 13/0045* (2013.01)

(58) Field of Classification Search
CPC ... G02B 13/0065; G02B 9/64; G02B 13/0045
See application file for complete search history.

(56) References Cited

U.S. PATENT DOCUMENTS

| | | |
|---|---|---|
| 2,106,752 A | 2/1938 | Land |
| 2,354,503 A | 7/1944 | Arthur |
| 2,378,170 A | 6/1945 | Aklin |
| 2,441,093 A | 5/1948 | Aklin |

(Continued)

FOREIGN PATENT DOCUMENTS

| | | |
|---|---|---|
| CN | 101634738 A | 1/2010 |
| CN | 102147519 A | 8/2011 |

(Continued)

OTHER PUBLICATIONS

A compact and cost effective design for cell phone zoom lens, Chang et al., Sep. 2007, 8 pages.

(Continued)

*Primary Examiner* — Wen Huang
(74) *Attorney, Agent, or Firm* — Nathan & Associates; Menachem Nathan

(57) ABSTRACT

Folded cameras with a total track length (TTL), f numbers smaller than 1.2 and large fields of view, e.g. of at least 60 degrees. Such folded cameras may comprise a lens with N≥7 lens elements, an image sensor and an optical path folding element for providing a folded optical path between an object and the lens, wherein an aperture stop of the lens is located closer to a first surface of the first lens element facing the object than a distance d that fulfills d/TTL=0.2.

18 Claims, 10 Drawing Sheets

(56) References Cited

U.S. PATENT DOCUMENTS

| | | | |
|---|---|---|---|
| 3,388,956 A | 6/1968 | Eggert et al. |
| 3,524,700 A | 8/1970 | Eggert et al. |
| 3,558,218 A | 1/1971 | Grey |
| 3,864,027 A | 2/1975 | Harada |
| 3,942,876 A | 3/1976 | Betensky |
| 4,134,645 A | 1/1979 | Sugiyama et al. |
| 4,338,001 A | 7/1982 | Matsui |
| 4,465,345 A | 8/1984 | Yazawa |
| 4,792,822 A | 12/1988 | Akiyama et al. |
| 5,000,551 A | 3/1991 | Shibayama |
| 5,327,291 A | 7/1994 | Baker et al. |
| 5,331,465 A | 7/1994 | Miyano |
| 5,969,869 A | 10/1999 | Hirai et al. |
| 6,014,266 A | 1/2000 | Obama et al. |
| 6,035,136 A | 3/2000 | Hayashi et al. |
| 6,147,702 A | 11/2000 | Smith |
| 6,169,636 B1 | 1/2001 | Kreitzer |
| 6,654,180 B2 | 11/2003 | Ori |
| 7,187,504 B2 | 3/2007 | Horiuchi |
| 7,206,136 B2 | 4/2007 | Labaziewicz et al. |
| 7,515,351 B2 | 4/2009 | Chen et al. |
| 7,564,635 B1 | 7/2009 | Tang |
| 7,643,225 B1 | 1/2010 | Tsai |
| 7,660,049 B2 | 2/2010 | Tang |
| 7,684,128 B2 | 3/2010 | Tang |
| 7,688,523 B2 | 3/2010 | Sano |
| 7,692,877 B2 | 4/2010 | Tang et al. |
| 7,697,220 B2 | 4/2010 | Iyama |
| 7,738,186 B2 | 6/2010 | Chen et al. |
| 7,777,972 B1 | 8/2010 | Chen et al. |
| 7,813,057 B2 | 10/2010 | Lin |
| 7,821,724 B2 | 10/2010 | Tang et al. |
| 7,826,149 B2 | 11/2010 | Tang et al. |
| 7,826,151 B2 | 11/2010 | Tsai |
| 7,869,142 B2 | 1/2011 | Chen et al. |
| 7,898,747 B2 | 3/2011 | Tang |
| 7,916,401 B2 | 3/2011 | Chen et al. |
| 7,918,398 B2 | 4/2011 | Li et al. |
| 7,957,075 B2 | 6/2011 | Tang |
| 7,957,076 B2 | 6/2011 | Tang |
| 7,957,079 B2 | 6/2011 | Tang |
| 7,961,406 B2 | 6/2011 | Tang et al. |
| 8,000,031 B1 | 8/2011 | Tsai |
| 8,004,777 B2 | 8/2011 | Sano et al. |
| 8,077,400 B2 | 12/2011 | Tang |
| 8,149,523 B2 | 4/2012 | Ozaki |
| 8,218,253 B2 | 7/2012 | Tang |
| 8,228,622 B2 | 7/2012 | Tang |
| 8,233,224 B2 | 7/2012 | Chen |
| 8,253,843 B2 | 8/2012 | Lin |
| 8,279,537 B2 | 10/2012 | Sato |
| 8,363,337 B2 | 1/2013 | Tang et al. |
| 8,395,851 B2 | 3/2013 | Tang et al. |
| 8,400,717 B2 | 3/2013 | Chen et al. |
| 8,451,549 B2 | 5/2013 | Yamanaka et al. |
| 8,503,107 B2 | 8/2013 | Chen et al. |
| 8,514,502 B2 | 8/2013 | Chen |
| 8,570,668 B2 | 10/2013 | Takakubo et al. |
| 8,718,458 B2 | 5/2014 | Okuda |
| 8,780,465 B2 | 7/2014 | Chae |
| 8,810,923 B2 | 8/2014 | Shinohara |
| 8,854,745 B1 | 10/2014 | Chen |
| 8,958,164 B2 | 2/2015 | Kwon et al. |
| 9,185,291 B1 | 11/2015 | Shabtay |
| 9,229,194 B2 | 1/2016 | Yoneyama et al. |
| 9,235,036 B2 | 1/2016 | Kato et al. |
| 9,279,957 B2 | 3/2016 | Kanda et al. |
| 9,438,792 B2 | 9/2016 | Nakada et al. |
| 9,488,802 B2 | 11/2016 | Chen et al. |
| 9,568,712 B2 | 2/2017 | Dror et al. |
| 9,678,310 B2 | 6/2017 | Iwasaki et al. |
| 9,817,213 B2 | 11/2017 | Mercado |
| 9,869,846 B1 | 1/2018 | Bone et al. |
| 10,330,892 B2 | 6/2019 | Hashimoto |
| 11,347,016 B2 | 5/2022 | Shabtay et al. |
| 12,066,605 B2 | 8/2024 | Shim |
| 2002/0118471 A1 | 8/2002 | Imoto |
| 2003/0048542 A1 | 3/2003 | Enomoto |
| 2005/0041300 A1 | 2/2005 | Oshima et al. |
| 2005/0062346 A1 | 3/2005 | Sasaki |
| 2005/0128604 A1 | 6/2005 | Kuba |
| 2005/0141103 A1 | 6/2005 | Nishina |
| 2005/0168840 A1 | 8/2005 | Kobayashi et al. |
| 2005/0270667 A1 | 12/2005 | Gurevich et al. |
| 2006/0092524 A1 | 5/2006 | Konno |
| 2006/0238902 A1 | 10/2006 | Nakashima et al. |
| 2006/0275025 A1 | 12/2006 | Labaziewicz et al. |
| 2007/0114990 A1 | 5/2007 | Godkin |
| 2007/0229983 A1 | 10/2007 | Saori |
| 2007/0247726 A1 | 10/2007 | Sudoh |
| 2007/0253689 A1 | 11/2007 | Nagai et al. |
| 2008/0056698 A1 | 3/2008 | Lee et al. |
| 2008/0094730 A1 | 4/2008 | Toma et al. |
| 2008/0094738 A1 | 4/2008 | Lee |
| 2008/0273250 A1 | 11/2008 | Nishio |
| 2008/0291531 A1 | 11/2008 | Heimer |
| 2008/0304161 A1 | 12/2008 | Souma |
| 2009/0002839 A1 | 1/2009 | Sato |
| 2009/0067063 A1 | 3/2009 | Asami et al. |
| 2009/0122423 A1 | 5/2009 | Park et al. |
| 2009/0135245 A1 | 5/2009 | Luo et al. |
| 2009/0141365 A1 | 6/2009 | Jannard et al. |
| 2009/0147368 A1 | 6/2009 | Oh et al. |
| 2009/0225438 A1 | 9/2009 | Kubota |
| 2009/0279191 A1 | 11/2009 | Yu |
| 2009/0303620 A1 | 12/2009 | Abe et al. |
| 2010/0026878 A1 | 2/2010 | Seo |
| 2010/0033844 A1 | 2/2010 | Katano |
| 2010/0060995 A1 | 3/2010 | Yumiki et al. |
| 2010/0165476 A1 | 7/2010 | Eguchi |
| 2010/0214664 A1 | 8/2010 | Chia |
| 2010/0277813 A1 | 11/2010 | Ito |
| 2011/0001838 A1 | 1/2011 | Lee |
| 2011/0032409 A1 | 2/2011 | Rossi et al. |
| 2011/0080655 A1 | 4/2011 | Mori |
| 2011/0102667 A1 | 5/2011 | Chua et al. |
| 2011/0102911 A1 | 5/2011 | Iwasaki |
| 2011/0115965 A1 | 5/2011 | Engelhardt et al. |
| 2011/0149119 A1 | 6/2011 | Matsui |
| 2011/0157430 A1 | 6/2011 | Hosoya et al. |
| 2011/0188121 A1 | 8/2011 | Goring et al. |
| 2011/0249347 A1 | 10/2011 | Kubota |
| 2012/0062783 A1 | 3/2012 | Tang et al. |
| 2012/0069455 A1 | 3/2012 | Lin et al. |
| 2012/0092777 A1 | 4/2012 | Tochigi et al. |
| 2012/0105708 A1 | 5/2012 | Hagiwara |
| 2012/0147489 A1 | 6/2012 | Matsuoka |
| 2012/0154929 A1 | 6/2012 | Tsai et al. |
| 2012/0194923 A1 | 8/2012 | Um |
| 2012/0229920 A1 | 9/2012 | Otsu et al. |
| 2012/0262806 A1 | 10/2012 | Lin et al. |
| 2013/0002933 A1 | 1/2013 | Topliss et al. |
| 2013/0057971 A1 | 3/2013 | Zhao et al. |
| 2013/0088788 A1 | 4/2013 | You |
| 2013/0176479 A1 | 7/2013 | Wada |
| 2013/0208178 A1 | 8/2013 | Park |
| 2013/0271852 A1 | 10/2013 | Schuster |
| 2013/0279032 A1 | 10/2013 | Suigetsu et al. |
| 2013/0286488 A1 | 10/2013 | Chae |
| 2014/0022436 A1 | 1/2014 | Kim et al. |
| 2014/0063616 A1 | 3/2014 | Okano et al. |
| 2014/0092487 A1 | 4/2014 | Chen et al. |
| 2014/0139719 A1 | 5/2014 | Fukaya et al. |
| 2014/0146216 A1 | 5/2014 | Okumura |
| 2014/0160581 A1 | 6/2014 | Cho et al. |
| 2014/0204480 A1 | 7/2014 | Jo et al. |
| 2014/0240853 A1 | 8/2014 | Kubota et al. |
| 2014/0285907 A1 | 9/2014 | Tang et al. |
| 2014/0293453 A1 | 10/2014 | Ogino et al. |
| 2014/0362274 A1 | 12/2014 | Christie et al. |
| 2015/0022896 A1 | 1/2015 | Cho et al. |
| 2015/0029601 A1 | 1/2015 | Dror et al. |
| 2015/0116569 A1 | 4/2015 | Mercado |
| 2015/0138431 A1 | 5/2015 | Shin et al. |

(56) References Cited

U.S. PATENT DOCUMENTS

| | | |
|---|---|---|
| 2015/0153548 A1 | 6/2015 | Kim et al. |
| 2015/0160438 A1 | 6/2015 | Okuda |
| 2015/0168667 A1 | 6/2015 | Kudoh |
| 2015/0177496 A1 | 6/2015 | Marks et al. |
| 2015/0205068 A1 | 7/2015 | Sasaki |
| 2015/0244942 A1 | 8/2015 | Shabtay et al. |
| 2015/0253532 A1 | 9/2015 | Lin |
| 2015/0253543 A1 | 9/2015 | Mercado |
| 2015/0253647 A1 | 9/2015 | Mercado |
| 2015/0323757 A1 | 11/2015 | Bone |
| 2015/0373252 A1 | 12/2015 | Georgiev |
| 2015/0373263 A1 | 12/2015 | Georgiev et al. |
| 2016/0007008 A1 | 1/2016 | Molgaard et al. |
| 2016/0033742 A1 | 2/2016 | Huang |
| 2016/0044250 A1 | 2/2016 | Shabtay et al. |
| 2016/0062084 A1 | 3/2016 | Chen et al. |
| 2016/0062136 A1 | 3/2016 | Nomura et al. |
| 2016/0070088 A1 | 3/2016 | Koguchi |
| 2016/0085089 A1 | 3/2016 | Mercado |
| 2016/0105616 A1 | 4/2016 | Shabtay et al. |
| 2016/0187631 A1 | 6/2016 | Choi et al. |
| 2016/0202455 A1 | 7/2016 | Aschwanden et al. |
| 2016/0212333 A1 | 7/2016 | Liege et al. |
| 2016/0241756 A1 | 8/2016 | Chen |
| 2016/0291295 A1 | 10/2016 | Shabtay |
| 2016/0306161 A1 | 10/2016 | Harada et al. |
| 2016/0313537 A1 | 10/2016 | Mercado |
| 2016/0341931 A1 | 11/2016 | Liu et al. |
| 2016/0349504 A1 | 12/2016 | Kim et al. |
| 2016/0353008 A1 | 12/2016 | Osborne |
| 2017/0023778 A1 | 1/2017 | Inoue |
| 2017/0094187 A1 | 3/2017 | Sharma et al. |
| 2017/0102522 A1 | 4/2017 | Jo |
| 2017/0115471 A1 | 4/2017 | Shinohara |
| 2017/0153422 A1 | 6/2017 | Tang et al. |
| 2017/0160511 A1 | 6/2017 | Kim et al. |
| 2017/0199360 A1 | 7/2017 | Chang |
| 2017/0276911 A1 | 9/2017 | Huang |
| 2017/0310952 A1 | 10/2017 | Adomat et al. |
| 2017/0329108 A1 | 11/2017 | Hashimoto et al. |
| 2017/0337703 A1 | 11/2017 | Wu et al. |
| 2018/0024319 A1 | 1/2018 | Lai et al. |
| 2018/0048825 A1 | 2/2018 | Wang |
| 2018/0059365 A1 | 3/2018 | Bone et al. |
| 2018/0059376 A1 | 3/2018 | Lin et al. |
| 2018/0081149 A1 | 3/2018 | Bae et al. |
| 2018/0120674 A1 | 5/2018 | Avivi et al. |
| 2018/0149835 A1 | 5/2018 | Park |
| 2018/0196236 A1 | 7/2018 | Ohashi et al. |
| 2018/0196238 A1 | 7/2018 | Goldenberg et al. |
| 2018/0217475 A1 | 8/2018 | Goldenberg et al. |
| 2018/0218224 A1 | 8/2018 | Olmstead et al. |
| 2018/0224630 A1 | 8/2018 | Lee et al. |
| 2018/0268226 A1 | 9/2018 | Shashua et al. |
| 2019/0025549 A1 | 1/2019 | Hsueh et al. |
| 2019/0025554 A1 | 1/2019 | Son |
| 2019/0049687 A1 | 2/2019 | Bachar et al. |
| 2019/0075284 A1 | 3/2019 | Ono |
| 2019/0086638 A1 | 3/2019 | Lee |
| 2019/0094500 A1 | 3/2019 | Tseng et al. |
| 2019/0107651 A1 | 4/2019 | Sade |
| 2019/0121216 A1 | 4/2019 | Shabtay et al. |
| 2019/0155002 A1 | 5/2019 | Shabtay et al. |
| 2019/0170965 A1 | 6/2019 | Shabtay |
| 2019/0187443 A1 | 6/2019 | Jia et al. |
| 2019/0187486 A1 | 6/2019 | Goldenberg et al. |
| 2019/0196148 A1 | 6/2019 | Yao et al. |
| 2019/0215440 A1 | 7/2019 | Rivard et al. |
| 2019/0222758 A1 | 7/2019 | Goldenberg et al. |
| 2019/0235202 A1 | 8/2019 | Smyth et al. |
| 2019/0353874 A1 | 11/2019 | Yeh et al. |
| 2020/0084358 A1 | 3/2020 | Nadamoto |
| 2020/0192069 A1 | 6/2020 | Makeev et al. |
| 2020/0221026 A1 | 7/2020 | Fridman et al. |
| 2020/0241233 A1 | 7/2020 | Shabtay et al. |
| 2020/0333691 A1 | 10/2020 | Shabtay et al. |
| 2020/0400926 A1 | 12/2020 | Bachar |
| 2021/0048628 A1 | 2/2021 | Shabtay et al. |
| 2021/0048649 A1 | 2/2021 | Goldenberg et al. |
| 2021/0165192 A1 | 6/2021 | Goldenberg et al. |
| 2021/0231914 A1* | 7/2021 | Chang .................. G02B 3/04 |
| 2021/0263276 A1 | 8/2021 | Huang et al. |
| 2021/0364746 A1 | 11/2021 | Chen |
| 2021/0396974 A1 | 12/2021 | Kuo |
| 2022/0046151 A1 | 2/2022 | Shabtay et al. |
| 2022/0066168 A1 | 3/2022 | Shi |
| 2022/0113511 A1 | 4/2022 | Chen |
| 2022/0206264 A1 | 6/2022 | Rudnick et al. |
| 2022/0232167 A1 | 7/2022 | Shabtay et al. |

FOREIGN PATENT DOCUMENTS

| | | |
|---|---|---|
| CN | 102193162 A | 9/2011 |
| CN | 102466865 A | 5/2012 |
| CN | 102466867 A | 5/2012 |
| CN | 102147519 B | 1/2013 |
| CN | 103576290 A | 2/2014 |
| CN | 103698876 A | 4/2014 |
| CN | 104297906 A | 1/2015 |
| CN | 104407432 A | 3/2015 |
| CN | 105467563 A | 4/2016 |
| CN | 105657290 A | 6/2016 |
| CN | 106680974 A | 5/2017 |
| CN | 104570280 B | 6/2017 |
| JP | S54157620 A | 12/1979 |
| JP | S59121015 A | 7/1984 |
| JP | 6165212 A | 4/1986 |
| JP | S6370211 A | 3/1988 |
| JP | H0233117 A | 2/1990 |
| JP | 406059195 A | 3/1994 |
| JP | H07325246 A | 12/1995 |
| JP | H07333505 A | 12/1995 |
| JP | H09211326 A | 8/1997 |
| JP | H11223771 A | 8/1999 |
| JP | 2000131610 A | 5/2000 |
| JP | 2000292848 A | 10/2000 |
| JP | 3210242 B2 | 9/2001 |
| JP | 2004334185 A | 11/2004 |
| JP | 2006195139 A | 7/2006 |
| JP | 2007133096 A | 5/2007 |
| JP | 2007164065 A | 6/2007 |
| JP | 2007219199 A | 8/2007 |
| JP | 2007306282 A | 11/2007 |
| JP | 2008111876 A | 5/2008 |
| JP | 2008191423 A | 8/2008 |
| JP | 2010032936 A | 2/2010 |
| JP | 2010164841 A | 7/2010 |
| JP | 2011145315 A | 7/2011 |
| JP | 2011151448 A | 8/2011 |
| JP | 2012203234 A | 10/2012 |
| JP | 2012230323 A | 11/2012 |
| JP | 2013003317 A | 1/2013 |
| JP | 2013003754 A | 1/2013 |
| JP | 2013101213 A | 5/2013 |
| JP | 2013105049 A | 5/2013 |
| JP | 2013106289 A | 5/2013 |
| JP | 2013148823 A | 8/2013 |
| JP | 2014142542 A | 8/2014 |
| JP | 2017116679 A | 6/2017 |
| JP | 2018059969 A | 4/2018 |
| JP | 2019113878 A | 7/2019 |
| KR | 20080088477 A | 10/2008 |
| KR | 20090019525 A | 2/2009 |
| KR | 20090131805 A | 12/2009 |
| KR | 20110058094 A | 6/2011 |
| KR | 20110115391 A | 10/2011 |
| KR | 20120068177 A | 6/2012 |
| KR | 20140135909 A | 5/2013 |
| KR | 20140023552 A | 2/2014 |
| KR | 20160000759 A | 1/2016 |
| KR | 101632168 B1 | 6/2016 |
| KR | 20160115359 A | 10/2016 |
| TW | M602642 U | 10/2020 |

(56) References Cited

FOREIGN PATENT DOCUMENTS

| WO | 2013058111 A1 | 4/2013 |
| WO | 2013063097 A1 | 5/2013 |
| WO | 2018130898 A1 | 7/2018 |

OTHER PUBLICATIONS

Consumer Electronic Optics: How small a lens can be? The case of panomorph lenses, Thibault et al., Sep. 2014, 7 pages.
Optical design of camera optics for mobile phones, Steinich et al., 2012, pp. 51-58 (8 pages).
The Optics of Miniature Digital Camera Modules, Bareau et al., 2006, 11 pages.
Modeling and measuring liquid crystal tunable lenses, Peter P. Clark, 2014, 7 pages.
Mobile Platform Optical Design, Peter P. Clark, 2014, 7 pages.
Boye et al., "Ultrathin Optics for Low-Profile Innocuous Imager", Sandia Report, 2009, pp. 56-56.
"Cheat sheet: how to understand f-stops", Internet article, Digital Camera World, 2017.
Husain Sumra: "Security Camera Field Of View Tips—How To Position Your Camera I Ooma", Aug. 2, 2019 (Aug. 2, 2019), XP093206028, Retrieved from the Internet: URL:https://www.ooma.com/blog/home-security/how-to-positionyour-.
Office Action in related EP patent application 21847019.3, dated Sep. 24, 2024.
Office Action in related CN patent application 202180004577.8, dated Nov. 13, 2024.

* cited by examiner

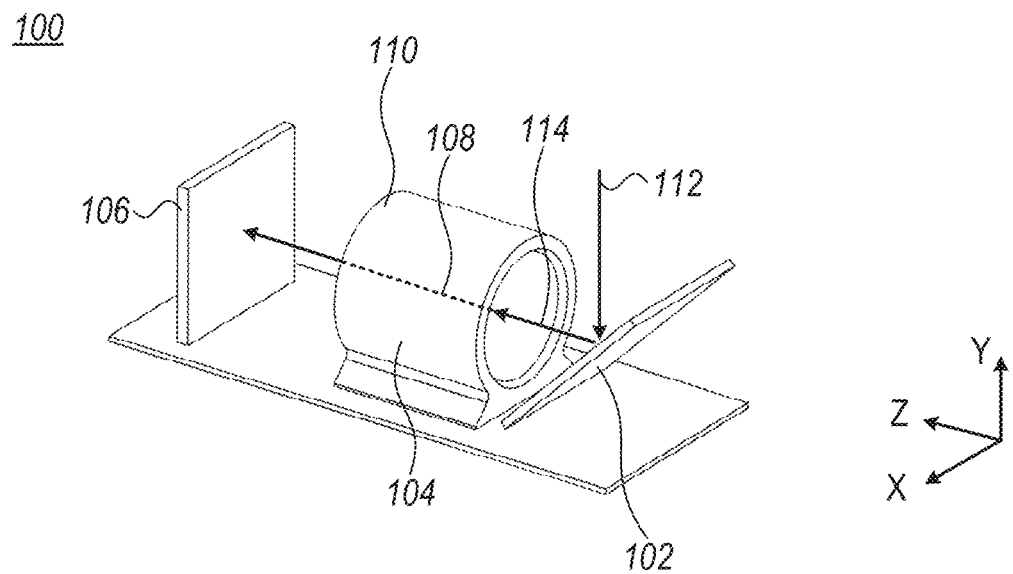
FIG. 1A   KNOWN ART
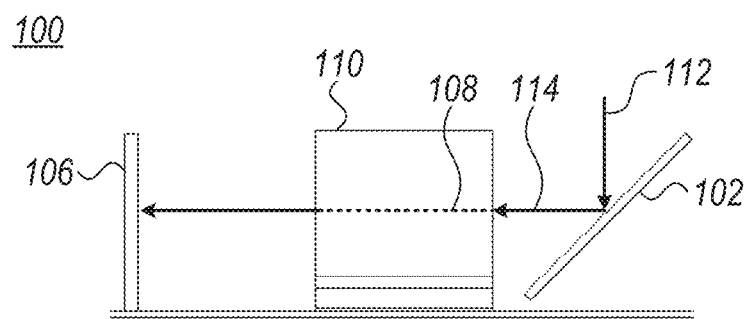
FIG. 1B   KNOWN ART

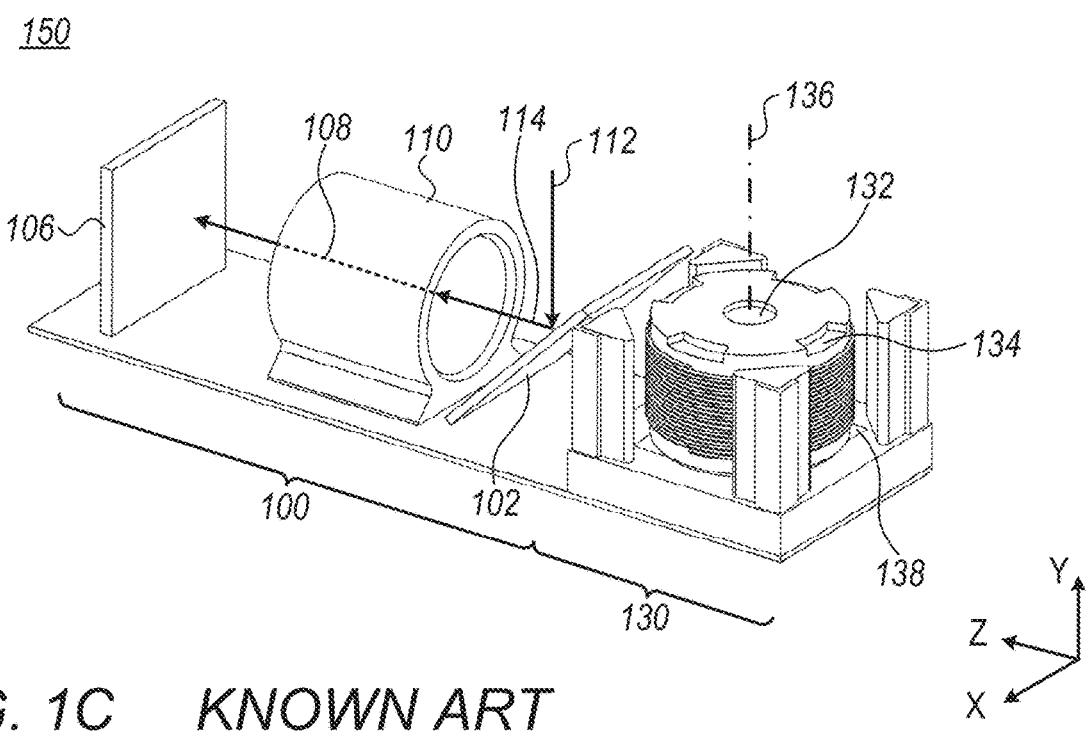
FIG. 1C  KNOWN ART

FOLDED CAMERA LENS DESIGNS INCLUDING EIGHT LENSES OF +-+-+++-REFRACTIVE POWERS

CROSS REFERENCE TO EXISTING APPLICATIONS

This application is a continuation of U.S. patent application Ser. No. 17/607,400 filed Oct. 29, 2021 (now allowed), which was a 371 application from international patent application No. PCT/IB2021/056357 filed Jul. 14, 2021, and is related to and claims the benefit of U.S. Provisional patent application 63/054,862 filed Jul. 22, 2020, which is incorporated herein by reference in its entirety.

FIELD

The presently disclosed subject matter is related generally to the field of digital cameras and in particular to folded optical designs in such cameras.

Definitions

In this application and for optical and other properties mentioned throughout the description and figures, the following symbols and abbreviations are used, all of which are known in the art:

Total track length (TTL): the maximal distance, measured along a direction parallel to the optical axis, between a point of the front surface $S_1$ of a first lens element $L_1$ of a lens (or "lens assembly") and an image sensor, when a camera system including the lens is focused to an infinity object distance.

Back focal length (BFL): the minimal distance, measured along a direction parallel to the first optical axis, between a point of the rear surface $S_{2N}$ of a last lens element $L_N$ of a lens (or "lens assembly") and the image sensor, when a camera system including the lens is focused to an infinity object distance.

Effective focal length (EFL): the distance between a rear principal point P' and a rear focal point F' of a lens assembly of lens elements $L_1$ to $L_N$.

f-number, (f/#): the ratio of the EFL to an entrance pupil diameter.

BACKGROUND

Dual-cameras or triple-cameras (or multi-cameras in general) for mobile devices such as smartphones are known. In a typical triple-camera, one camera has an Ultra-Wide (UV) field of view (FOV) $FOV_{UW}$, another camera has a Wide field of view $FOV_W$ narrower than $FOV_{UW}$ and yet another camera has Tele field of view $FOV_T$ narrower than $FOV_W$. These cameras are also referred to herein as, respectively, an Ultra-Wide (or UW) camera, a Wide (or W) camera and a Tele (or T) camera. In general, the Wide camera is considered to be a smartphone's main camera.

The f-number ("f/#") of a camera lens is the ratio of the effective focal length (EFL) to the diameter D of the camera's entrance pupil: f/#=EFL/D. The entrance pupil is the optical image of the aperture stop, as 'seen' through the front aperture of the lens system. The front aperture is the object-sided aperture of the lens. A low f/# is desired for a smartphone's main camera as it has 3 major advantages: good low light sensitivity, strong "natural" Bokeh effect and high image resolution, discussed next:

1. Low light sensitivity is a major performance drawback of today's mobile device compatible cameras when compared to e.g. digital single-lens reflex (DSLR) cameras. As an example, halving a camera's f/#(for same EFL) increases the aperture area by a factor of 4, meaning that 4 times more light enters the camera. This difference is especially relevant when capturing low light scenes.

2. Bokeh is the aesthetic quality of the blur produced in the out-of-focus segments of an image, and it is a highly demanded feature for today's smartphones. The Bokeh effect correlates inversely with the depth of field (DOF) of an image, wherein DOF~f/#. A low f/# is beneficial for supporting strong "natural" Bokeh effects. As the f/#s present in today's smartphone cameras do not provide sufficient "natural" Bokeh, the demand for strong Bokeh is answered by "artificial" Bokeh, i.e. artificially applying blur to out-of-focus image segments.

3. Image sensors with continuously increasing pixel resolution are entering mobile devices, exceeding 100 megapixel in 2019 for the first time. This (amongst other factors) is achieved by shrinking the size of single pixels, i.e. increasing the spatial pixel frequency. For translating pixel resolution to image resolution, a camera's lens must support the spatial pixel frequency $k_{Pixel}$ of the sensor. For a well-designed (diffraction-limited) camera lens, the resolvable spatial frequency of the lens $k_{Lens}$ depends inversely on the f/#: $k_{Lens} \sim 1/f/\#$, i.e. a lower f/# corresponds to a higher image resolution (assuming an image sensor with sufficient spatial pixel frequency).

The latest premium smartphones are equipped with main Wide cameras that have f/# of about f/1.9 (Huawei P40 Pro) and f/1.8 (Apple iphone 11 Pro Max). A major challenge in low f/# cameras is the design of lenses that correct for the strong aberration imposed by the large front apertures required, e.g. for correction of chromatic aberration. This is usually tackled by a more complex lens design that includes a larger number of lens elements. However, this generally leads to larger total track length (TTL) and larger camera module heights, what is detrimental to the goal of slim smartphone design.

A recent development in mobile Tele cameras involves using a prism to "fold" the Tele camera: a reflecting or optical path folding element ("OPFE") is added to the optical path in order to "fold" (tilt) the light propagation direction from perpendicular to the back surface of a host device to parallel to the host device's back surface. Folded cameras allow large TTLs in a slim camera design.

For improving a smartphone's main camera it would be beneficial to have a folded Wide camera designs with low f/#.

SUMMARY

In various embodiments there are provided folded cameras, comprising: a lens with N 7 lens elements $L_i$, having an effective focal length (EFL), each $L_i$ having a respective focal length $f_i$ wherein a first lens element $L_1$ faces an object side; an image sensor; and an OPFE for providing a folded optical path between an object and the lens, to the lens optical axis, wherein a folded camera has a total track length (TTL), wherein an aperture stop of the lens is located closer to a first surface of the first lens element facing the object than a distance d that fulfills d/TTL=0.2, and wherein an f number f/# of the camera is smaller than 1.2.

In various embodiments there are provided folded cameras, comprising: a lens having an effective focal length (EFL) and including N≥7 lens elements $L_i$ having a first optical axis, each lens element having a respective focal length $f_i$ and comprising a respective front surface $S_{2i-1}$ and a respective rear surface $S_{2i}$, the lens element surfaces marked $S_k$ where $1 \leq k \leq 2N$, wherein each lens element surface $S_k$ has a clear height value $CH(S_k)$, wherein clear height value $CH(S_{17})$ of surface $S_{17}$ is greater than or equal to a clear height value of each of surfaces $S_2$ to $S_{2N-1}$; an image sensor; and an OPFE for providing a folded optical path between an object and the lens elements, and wherein an f number f/# of the camera is smaller than 1.2.

In some embodiments, f/#<1.1.

In some embodiments, f/#≤1.0.

In some embodiments, 0.8<f/#≤1.0.

In some embodiments, a folded camera as above or below has a diagonal FOV that is larger than 60 degrees.

In some embodiments, $|f_i|>4 \cdot EFL$ for $1 \leq i \leq 3$.

In some embodiments, $|f_i|>5 \cdot EFL$ for $1 \leq i \leq 3$.

In some embodiments, $L_5$ is the lens element with the strongest optical power, i.e. $|f_5|<|f_i|$ for $i \neq 5$.

In some embodiments, $f_5<EFL$.

In some embodiments, a lens sub-system including lens elements $L_4$ and $L_5$ has positive refractive power.

In some embodiments, focal lengths $f_4$ of $L_4$ and $f_5$ of $L_5$ satisfy $|f_4|<4 \cdot f_5$.

In some embodiments, focal lengths $f_4$ of $L_4$ and $f_5$ of $L_5$ satisfy $|f_4|<3 \cdot f_5$.

In some embodiments, the lens includes at least one air gap between lens elements that comply with the condition STD<0.020, where STD is a normalized gap standard deviation.

In some embodiments, the lens includes at least one air gap between lens elements that comply with the condition STD<0.010, where STD is a normalized gap standard deviation.

In some embodiments, an air gap between lens elements $L_4$ and $L_5$ satisfies STD<0.020, where STD is a normalized gap standard deviation.

BRIEF DESCRIPTION OF THE DRAWINGS

Non-limiting examples of embodiments disclosed herein are described below with reference to figures attached hereto that are listed following this paragraph. The drawings and descriptions are meant to illuminate and clarify embodiments disclosed herein, and should not be considered limiting in any way. Like elements in different drawings may be indicated by like numerals. Elements in the drawings are not necessarily drawn to scale. In the drawings:

FIG. 1A illustrates a known digital folded camera that may operate as a Wide camera in a perspective view;

FIG. 1B shows the camera of FIG. 1A in a side view;

FIG. 1C illustrates a known dual camera that includes a folded camera as in FIGS. 1A and 1B together with an "upright" (non-folded) camera;

DETAILED DESCRIPTION

Figure 2A:
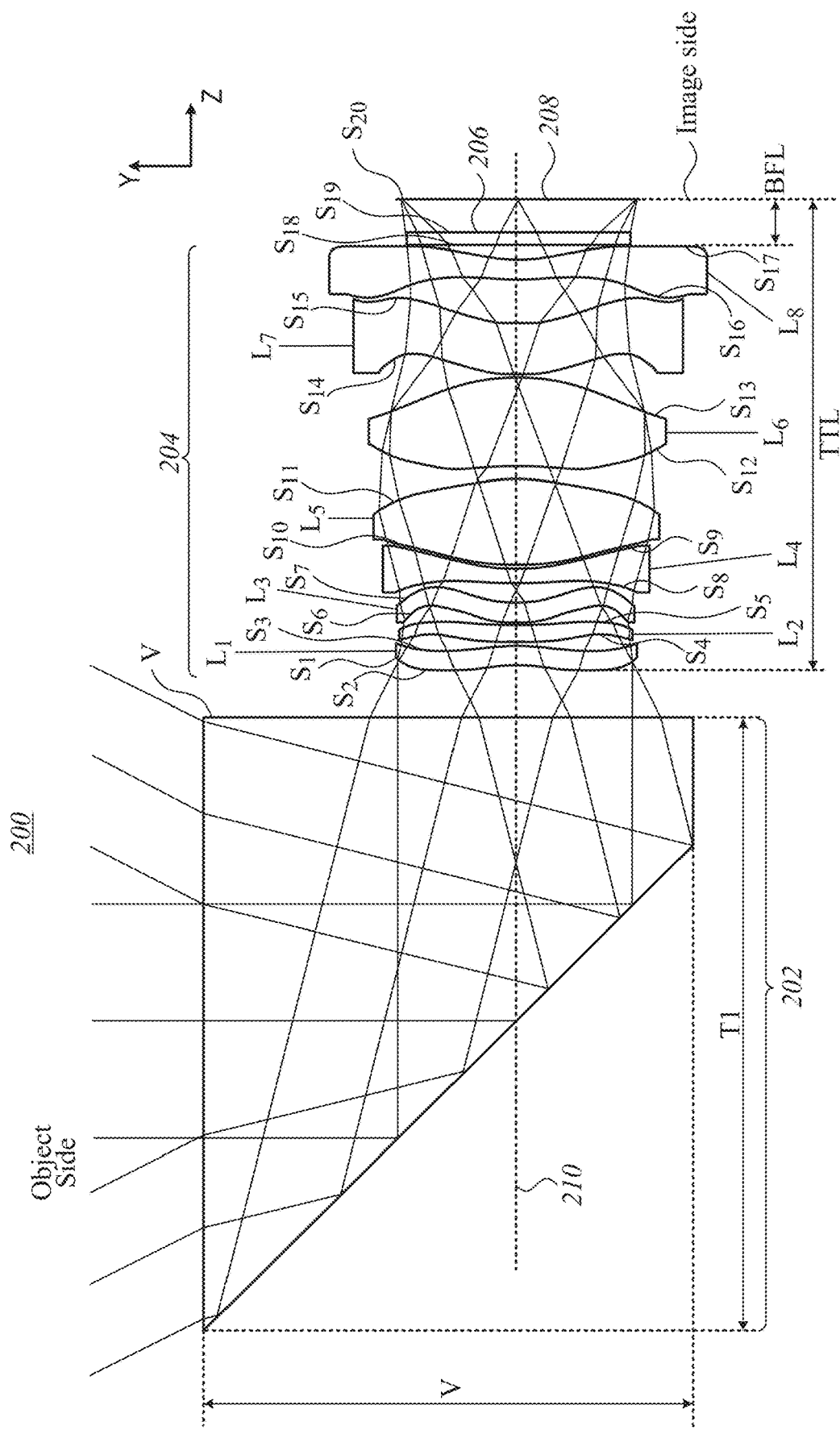
FIG. 2A shows a schematic view of a folded optical lens system according to some examples of the presently disclosed subject matter.

In the following detailed description, numerous specific details are set forth in order to provide a thorough understanding. However, it will be understood by those skilled in the art that the presently disclosed subject matter may be practiced without these specific details. In other instances, well-known methods have not been described in detail so as not to obscure the presently disclosed subject matter.

It is appreciated that certain features of the presently disclosed subject matter, which are, for clarity, described in the context of separate embodiments, may also be provided in combination in a single embodiment. Conversely, various features of the presently disclosed subject matter, which are, for brevity, described in the context of a single embodiment, may also be provided separately or in any suitable sub-combination.

Furthermore, for the sake of clarity the term "substantially" is used herein to imply the possibility of variations in values within an acceptable range. According to one example, the term "substantially" used herein should be interpreted to imply possible variation of up to 10% over or under any specified value. According to another example, the term "substantially" used herein should be interpreted to imply possible variation of up to 5% over or under any specified value. According to a further example, the term "substantially" used herein should be interpreted to imply possible variation of up to 2.5% over or under any specified value.

FIGS. 1A and 1B illustrate a known digital folded camera 100, which may operate for example as a Wide camera. Camera 100 comprises an optical path folding element (OPFE) 102 e.g. a prism, a lens 104 with a plurality of lens elements (not visible in this representation, but visible e.g. in FIGS. 2A-D) and an image sensor 106. In some embodiments (as in FIGS. 2A-2D), the lens elements are axial symmetric along a first optical axis 108. In other embodiments the lens elements may not be axial symmetric. For example, lens elements may be cut (or diced or sliced) to a non-circular shape, as e.g. demonstrated in FIG. 2B.

At least some of the lens elements can be held by a structure called a "barrel" 110. The barrel may have a longitudinal symmetry along optical axis 108. In FIGS. 1A to 1C, the cross-section of this barrel is circular. This is however not mandatory and other shapes can be used, e.g. for hosting cut lens elements.

The path of the optical rays from an object (not shown) to image sensor 106 defines an optical path (see optical paths 112 and 114, which represent portions of the optical path).

OPFE folds the optical path from a first optical path 112 to a second optical path 114. Optical path 114 is substantially parallel to the optical axis 108. The optical path is thus referred to as "folded optical path" (indicated by optical paths 112 and 114) and camera 100 is referred to as "folded camera".

In particular, in some examples, OPFE 102 is inclined at substantially 45° with respect to optical axis 108. In FIG. 1A, OPFE 102 is also inclined at substantially 45° with respect to optical path 112.

In some known examples, image sensor 106 lies in a X-Y plane substantially perpendicular to optical axis 108. This is however not limiting and the image sensor 106 can have a different orientation. For example, and as described in WO 2016/024192, image sensor 106 can be in the XZ plane. In this case, an additional OPFE can be used to reflect the optical rays towards image sensor 106.

Two cameras, for example a Wide camera 100 and a regular UW camera 130 may be included in a digital camera 150 (also referred to as dual-camera). A possible configuration is shown in FIG. 1C.

UW camera 130 may include an aperture 132 (indicating object side of the camera) and an optical lens system 134 (or "Wide lens module") with a symmetry (and optical) axis 136 in the Y direction, as well as a UW image sensor 138. The UW camera comprises a UW lens system configured to provide a UW image. As already indicated above, the UW camera has a field of view $FOV_{UW}$ larger than the field of view of the Wide camera $FOV_W$. For example, $FOV_{UW}$ may be 80-130 degrees and $FOV_W$ may be 60-90 deg. Notably, in other examples, a plurality of Wide cameras and/or a plurality of Tele cameras can be incorporated and operative in a single digital camera. The $FOV_T$ of a Tele camera may be for example 20-50 degrees.

Attention is now drawn to FIG. 2A which depicts schematically an optical lens system disclosed herein and numbered 200. Lens system 200 comprises an OPFE 202, a lens (or "lens assembly") 204, an optical element 206 and an image sensor 208. System 200 is shown with ray tracing. Optical element 206 may be for example infra-red (IR) filter, and/or a glass image sensor dust cover. Optical rays (after their reflection by prism 202) pass through lens 204 and form an image on image sensor 208. FIG. 2A shows 3 fields with 3 rays for each: the upper marginal-ray, the lower marginal-ray and the chief-ray. In the example of FIG. 2A, the optical rays pass through optical element 206 before impinging on image sensor 208. This is however not limiting, and in some examples, optical element 206 is not present, i.e. in some lens systems, the optical element is optional.

Lens 204 includes a plurality of N lens elements $L_i$ 220 (wherein "i" is an integer between 1 and N). $L_1$ is the lens element closest to the object (prism) side and $L_N$ is the lens element closest to the image side, i.e. the side where the image sensor is located. This order holds for all lenses and lens elements disclosed herein. Lens elements $L_i$ can be used e.g. as lens elements of camera 100 above. The N lens elements are axial symmetric along an optical axis 210. Each lens element $L_i$ comprises a respective front surface $S_{2i-1}$ (the index "2i−1" being the number of the front surface) and a respective rear surface $S_{2i}$ (the index "2i" being the number of the rear surface), where "i" is an integer between 1 and N. This numbering convention is used throughout the description. Alternatively, as done throughout this description, lens surfaces are marked as "$S_k$", with k running from 1 to 2N. The front surface and the rear surface can be in some cases aspherical. This is however not limiting.

As used herein the term "front surface" of each lens element refers to the surface of a lens element located closer to the entrance of the camera (camera object side) and the term "rear surface" refers to the surface of a lens element located closer to the image sensor (camera image side).

In lens system 200, a first horizontal surface of the prism (oriented along Z direction), marked as T1, is 10.93 mm. A second horizontal surface of the prism (oriented along the X direction, not shown) and marked T2 is 12.6 mm. The vertical surface of the prism (along Y) marked V is 8.68 mm. The angle of the prism is 45 deg. The relatively large prism size allows for a high amount of light entering the camera, which allows the camera to have in this example a low f/# of 1.0. In other embodiments, f/# may be 0.8-1.2. The aperture stop of lens 204 is located at a distance d=−0.042 mm from $S_2$, i.e. from the first surface of the first lens element. For the non-zero fields shown in lens system 200, about 80% of light reaches image sensor 208.

As explained below, a clear height value $CH(S_k)$ can be defined for each surface $S_k$ for 1≤k≤2N), and a clear aperture value $CA(S_k)$ can be defined for each surface $S_k$ for 1≤k≤2N). $CA(S_k)$ and $CH(S_k)$ define optical properties of each surface $S_k$ of each lens element. The CH term is defined with reference to FIG. 4 and the CA term is defined with reference to FIG. 5, below.

Figure 6:
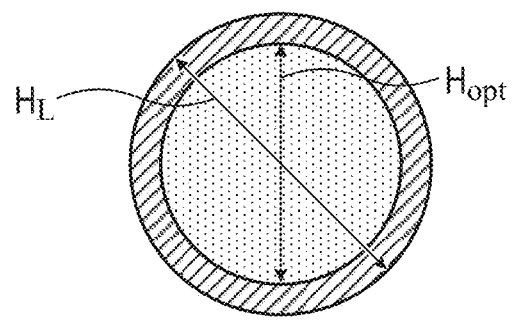
FIG. 6 provides a graphical illustration of diameter $H_{Li}$ of lens element $L_i$.

In addition a height ("$H_{Li}$", for 1≤i≤N) is defined for each lens element $L_i$. $H_{Li}$ corresponds, for each lens element $L_i$, to the maximal height of lens element $L_i$ measured along a direction perpendicular to the optical axis of the lens elements. For a given lens element, the height is greater than, or equal to the clear height value CH and the clear aperture value CA of the front and rear surfaces of this given lens element. Typically, for an axial symmetric lens element, $H_{Li}$ is the diameter of lens element $L_i$ as seen in FIG. 6. Typically, for an axial symmetric lens element, $H_{Li}$=max{$CA(S_{2i-1})$, $CA(S_{2i})$}+mechanical part size.

In general, in lens design the mechanical part size is defined as not contributing to the optical properties of the lens. Because of this, one defines two heights of a lens: an optical height $H_{opt}$ (corresponding to the CA value) of an optically active area (dotted) and a geometrical (or mechanical) height of the lens $H_L$ which covers an optically active and an optically inactive area. The mechanical part size contribution to $H_{Li}$ is typically 200-1000 μm.

In lens 204, the clear aperture of the last surface $S_{17}$ of the last lens element $L_8$, $CA_{17}$, is larger than the CA of all other surfaces $S_i$ of the lens elements, i.e. $CA_{17} > CA_i$ for i<17. The CA of the first surface $S_{16}$ of last lens element $L_8$, $CA_{16}$, is larger than the CA of all preceding surfaces $S_i$ of the lens elements, i.e. $CA_{16} > CA_i$ for i<16.

In lens system 200, N is equal to eight. This is however not limiting and a different number of lens elements can be used. According to some examples, N is equal to or greater than 7. For example, N can be equal to 7, 8, 9 or 10.

In lens system 200, some of the surfaces of the lens elements are represented as convex, and some are represented as concave. The representation of FIG. 2A is however not limiting and a different combination of convex and/or concave surfaces can be used, depending on various factors such as the application, the desired optical power, etc.

Figure 7:
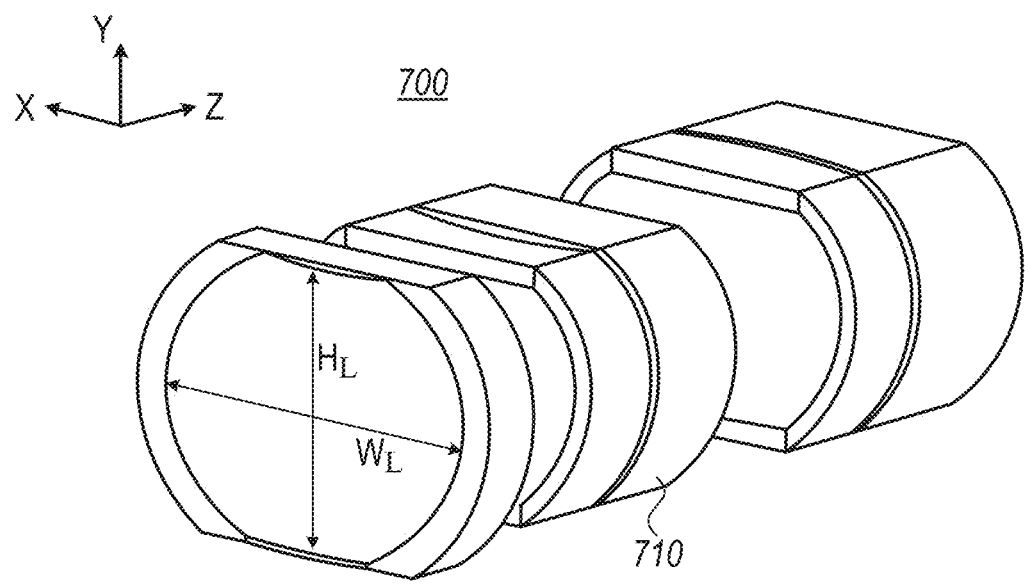
FIG. 7 shows an exploded view of lens elements illustrating lens element width $W_{Li}$ and height $H_{Li}$.

A lens barrel such as lens barrel 110 may carry lens 204. In some embodiments the lens barrel may be circular such as lens barrel 110. In other embodiments the lens barrel may be not be circular but may have a shape such as the lens elements in FIG. 7. Referring to FIG. 7, a non-circular lens barrel may have a X axis or a Y axis as symmetry axis. A non-circular lens barrel may e.g. be shaped according to the cut lens elements of a lens such as lens 204'. The height of a lens barrel may be only slightly higher than the lens element having the largest height in the lens. E.g. a lens barrel may be 0-0.5 mm higher than the highest lens element. A lens barrel having an identical height as the highest lens element is described for example in co-owned international patent application PCT/IB2018/050988, which is incorporated herein by reference in its entirety.

Figure 3A:
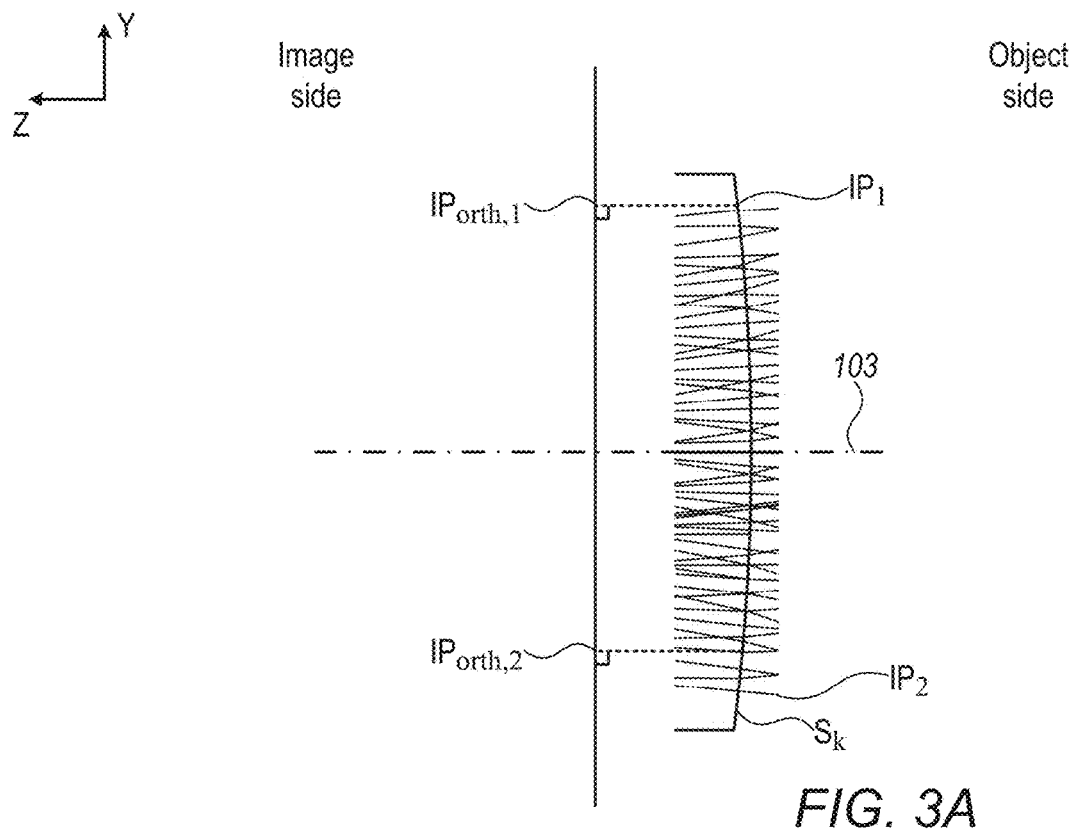
FIG. 3A illustrates the orthogonal projections $IP_{orth,1}$, $IP_{orth,2}$ of two impact points $IP_1$ and $IP_2$ on a plane P that is orthogonal to the optical axis of the lens of the system in FIGS. 2A-2D.
Figure 3B:
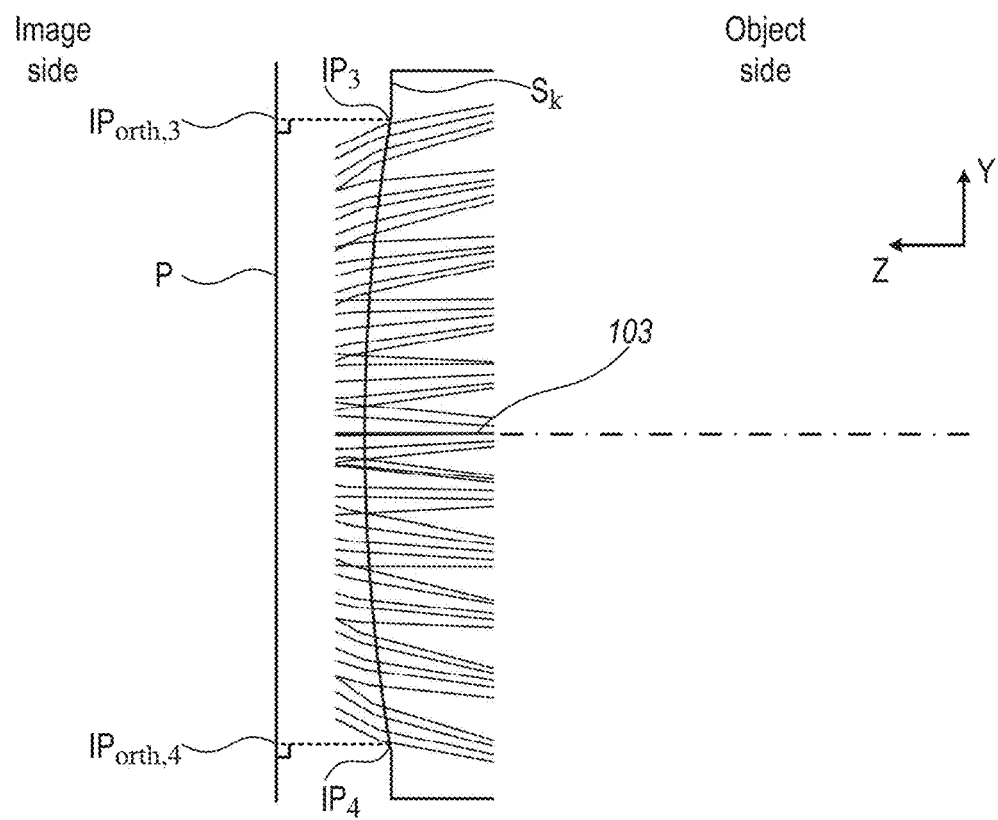
FIG. 3B illustrates the orthogonal projections $IP_{orth,3}$, $IP_{orth,4}$ of two impact points $IP_3$ and $IP_4$ on a plane P that is orthogonal to the optical axis of the lens of the system in FIGS. 2A-2D.
Figure 4:
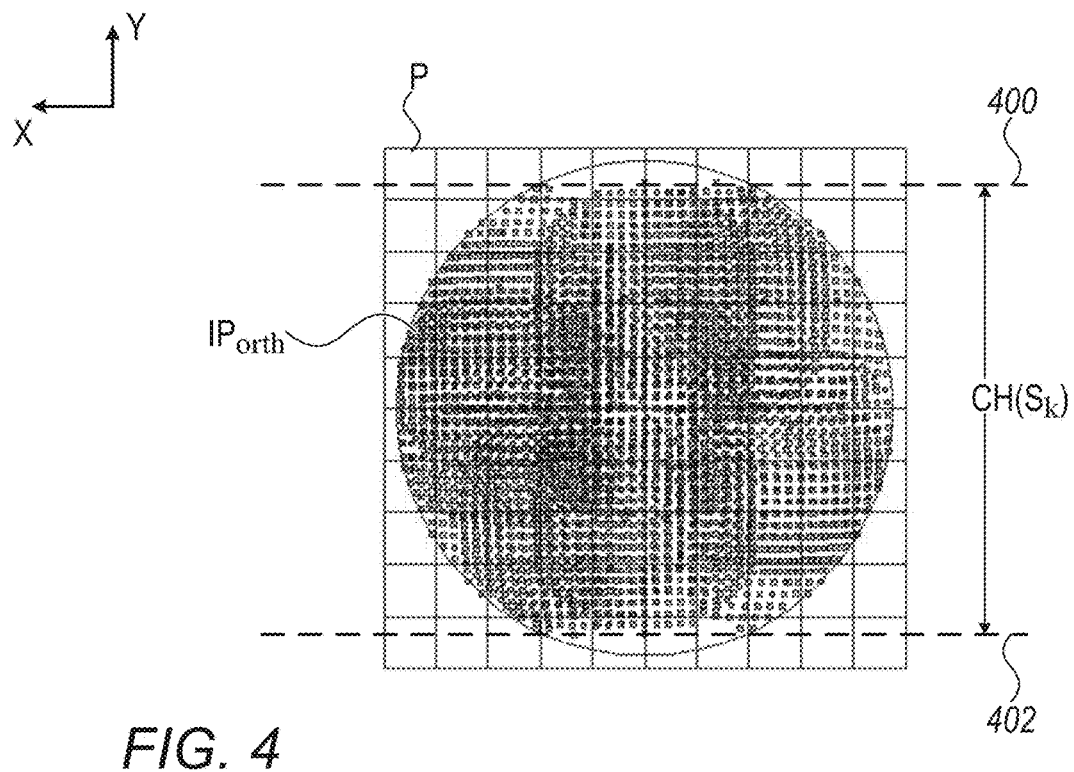
FIG. 4 provides graphically a definition of clear height.

As shown in FIGS. 3A, 3B and 4, each optical ray that passes through a surface $S_k$ (for $1 \leq k \leq 2N$) impinges this surface on an impact point IP. Optical rays enter optical lens system 200 from surface $S_1$ and pass through surfaces $S_2$ to $S_{2N}$. Some optical rays can impinge on any surface $S_k$ but cannot/will not reach image sensor 208. For a given surface $S_k$, only optical rays that can form an image on image sensor 208 are considered. $CH(S_k)$ is defined as the distance between two closest possible parallel lines, see lines 400 and 402 in FIG. 4 located on a plane P orthogonal to the optical axis of the lens elements. In the representation of FIGS. 3A and 3B, plane P is parallel to plane X-Y and is orthogonal to optical axis 103 such that the orthogonal projection $IP_{orth}$ of all impact points IP on plane P is located between the two parallel lines. $CH(S_k)$ can be defined for each surface $S_k$ (front and rear surfaces, with $1 \leq k \leq 2N$).

The definition of $CH(S_k)$ does not depend on the object currently imaged, since it refers to the optical rays that "can" form an image on the image sensor. Thus, even if the currently imaged object is located in a black background that does not produce light, the definition does not refer to this black background since it refers to any optical rays that "can" reach the image sensor to form an image (for example optical rays emitted by a background which would emit light, contrary to a black background).

For example, FIG. 3A illustrates the orthogonal projections $IP_{orth,1}$, $IP_{orth,2}$ of two impact points $IP_1$ and $IP_2$ on plane P which is orthogonal to optical axis 103. By way of example, in the representation of FIG. 3A, surface $S_k$ is convex.

FIG. 3B illustrates the orthogonal projections $IP_{orth,3}$, $IP_{orth,4}$ of two impact points $IP_3$ and $IP_4$ on plane P. By way of example, in the representation of FIG. 3B, surface $S_k$ is concave.

In FIG. 4, the orthogonal projection $IP_{orth}$ of all impact points IP of a surface $S_k$ on plane P is located between parallel lines 400 and 402. $CH(S_k)$ is thus the distance between lines 400 and 402.

Figure 5:
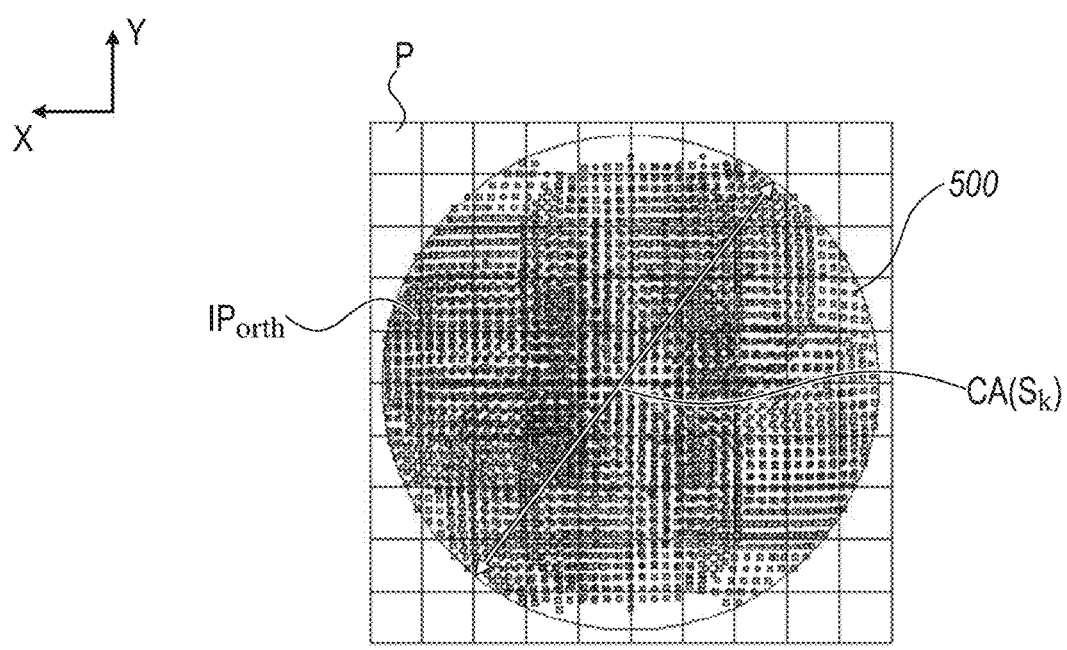
FIG. 5 provides graphically a definition of clear aperture.

Attention is drawn to FIG. 5. According to the presently disclosed subject matter, a clear aperture $CA(S_k)$ is defined for each given surface $S_k$ (for $1 \leq k \leq 2N$) as the diameter of a circle, wherein the circle is the smallest possible circle located in a plane P orthogonal to the optical axis 108 and encircling all orthogonal projections $IP_{orth}$ of all impact points on plane P. As mentioned above with respect to $CH(S_k)$, it is noted that the definition of $CA(S_k)$ also does not depend on the object which is currently imaged.

As shown in FIG. 5, the circumscribed orthogonal projection $IP_{orth}$ of all impact points IP on plane P is a circle 500. The diameter of circle 500 defines $CA(S_k)$.

Detailed optical data and surface data are given in Tables 1-3 for the example of the lens elements in FIG. 2A. The values provided for these examples are purely illustrative and according to other examples, other values can be used.

Surface types are defined in Table 1 and the coefficients for the surfaces are defined in Table 2:

Surface types are:

a) Plano: flat surfaces, no curvature b) Q type 1 (QT1) surface sag formula:

$$z(r) = \frac{cr^2}{1 + \sqrt{1 - (1+k)c^2 r^2}} + D_{con}(u) \quad \text{(Eq. 1)}$$

$$D_{con}(u) = u^4 \sum_{n=0}^{N} A_n Q_n^{con}(u^2)$$

$$u = \frac{r}{r_{norm}}, \quad x = u^2$$

$$Q_0^{con}(x) = 1 \quad Q_1^{con} = -(5 - 6x) \quad Q_2^{con} = 15 - 14x(3 - 2x)$$

$$Q_3^{con} = -\{35 - 12x[14 - x(21 - 10x)]\}$$

$$Q_4^{con} = 70 - 3x\{168 - 5x[84 - 11x(8 - 3x)]\}$$

$$Q_5^{con} = -[126 - x(1260 - 11x\{420 - x[720 - 13x(45 - 14x)]\})]$$

where $\{z, r\}$ are the standard cylindrical polar coordinates, c is the paraxial curvature of the surface, k is the conic parameter, $r_{norm}$ is generally one half of the surface's clear aperture, and $A_n$ are the polynomial coefficients shown in lens data tables. The Z axis is positive

TABLE 1

Lens system 200
EFL = 4.14 mm, F/# = 1.00, Diagonal FOV = 80.4 deg.

| Surface # | Comment | Type | Curvature Radius | Thickness | Aperture Radius (D/2) | Material | Index | Abbe # | Focal Length |
|---|---|---|---|---|---|---|---|---|---|
| 1 | A.S | Plano | Infinity | −0.042 | 2.078 | | | | |
| 2 | Lens 1 | QT1 | −3.314 | 0.354 | 2.078 | Plastic | 1.54 | 55.9 | 26.78 |
| 3 | | | −2.804 | 0.058 | 2.018 | | | | |
| 4 | Lens 2 | QT1 | 11.125 | 0.294 | 2.002 | Plastic | 1.66 | 20.4 | −55.77 |
| 5 | | | 8.474 | 0.040 | 2.010 | | | | |
| 6 | Lens 3 | QT1 | 2.122 | 0.359 | 1.967 | Plastic | 1.65 | 21.5 | 34.22 |
| 7 | | | 2.186 | 0.355 | 2.050 | | | | |
| 8 | Lens 4 | QT1 | 9.582 | 0.256 | 2.065 | Plastic | 1.67 | 19.4 | −7.46 |
| 9 | | | 3.266 | 0.061 | 2.305 | | | | |
| 10 | Lens 5 | QT1 | 4.164 | 1.565 | 2.357 | Plastic | 1.54 | 55.9 | 3.38 |
| 11 | | | −2.887 | 0.219 | 2.481 | | | | |
| 12 | Lens 6 | QT1 | −3.676 | 1.591 | 2.579 | Plastic | 1.54 | 55.9 | 99.93 |
| 13 | | | −3.971 | 0.040 | 2.583 | | | | |
| 14 | Lens 7 | QT1 | 2.537 | 0.912 | 2.436 | Plastic | 1.67 | 19.4 | 13.54 |
| 15 | | | 3.002 | 0.801 | 2.852 | | | | |

TABLE 1-continued

Lens system 200
EFL = 4.14 mm, F/# = 1.00, Diagonal FOV = 80.4 deg.

| Surface # | Comment | Type | Curvature Radius | Thickness | Aperture Radius (D/2) | Material | Index | Abbe # | Focal Length |
|---|---|---|---|---|---|---|---|---|---|
| 16 | Lens 8 | QT1 | 8.867 | 0.354 | 2.974 | Plastic | 1.66 | 20.4 | −8.81 |
| 17 | | | 3.479 | 0.259 | 3.285 | | | | |
| 18 | Filter | Plano | Infinity | 0.210 | — | Glass | 1.52 | 64.2 | |
| 19 | | | Infinity | 0.610 | — | | | | |
| 20 | Image | Plano | Infinity | — | — | | | | | towards image. Values for CA are given as a clear aperture radius, i.e. CA/2. The reference wavelength is 555.0 nm. Units are in mm except for refraction index ("Index") and Abbe #. Each lens element $L_i$ has a respective focal length $f_i$, given in Table 1.

TABLE 2

Aspheric Coefficients

| Surface # | $R_{norm}$ | A0 | A1 | A2 | A3 |
|---|---|---|---|---|---|
| 2 | 1.96E+00 | 7.01E−01 | −4.57E−02 | 1.03E−02 | −9.49E−04 |
| 3 | 1.98E+00 | 8.98E−01 | −9.70E−02 | 1.92E−02 | −5.01E−03 |
| 4 | 1.96E+00 | −7.58E−02 | −8.16E−02 | 1.72E−02 | 1.98E−03 |
| 5 | 1.90E+00 | −2.09E−01 | −2.62E−02 | 7.39E−03 | 2.93E−03 |
| 6 | 1.76E+00 | −6.48E−01 | −4.85E−02 | −2.11E−03 | −1.95E−03 |
| 7 | 1.79E+00 | −7.12E−01 | −5.06E−02 | 4.56E−03 | −4.47E−04 |
| 8 | 1.80E+00 | −2.24E−01 | −7.75E−03 | 7.30E−03 | −1.86E−03 |
| 9 | 1.84E+00 | −2.52E−01 | 1.46E−02 | 2.39E−03 | −3.73E−03 |
| 10 | 1.98E+00 | −1.56E−01 | −3.39E−04 | 1.13E−03 | −7.45E−04 |
| 11 | 2.04E+00 | 5.32E−01 | −7.05E−02 | 6.97E−03 | 3.13E−04 |
| 12 | 2.14E+00 | 8.97E−01 | −1.12E−01 | 1.97E−02 | −2.85E−03 |
| 13 | 2.09E+00 | 1.58E−02 | 2.61E−02 | −4.19E−03 | 7.93E−04 |
| 14 | 2.13E+00 | −7.72E−01 | −5.12E−02 | −1.16E−02 | −6.42E−04 |
| 15 | 2.63E+00 | −1.11E+00 | −1.05E−01 | 4.11E−02 | −2.53E−05 |
| 16 | 2.73E+00 | −9.92E−01 | 1.86E−01 | 2.37E−02 | −1.12E−02 |
| 17 | 3.20E+00 | −2.04E+00 | 1.88E−01 | −6.16E−02 | −2.74E−02 |

| Surface # | A4 | A5 | A6 | A7 | A8 |
|---|---|---|---|---|---|
| 2 | 1.37E−04 | 3.42E−05 | 1.55E−06 | 0.00E+00 | 0.00E+00 |
| 3 | 8.19E−04 | −1.08E−04 | 5.14E−06 | 0.00E+00 | 0.00E+00 |
| 4 | −8.58E−04 | 5.69E−05 | −2.90E−04 | 0.00E+00 | 0.00E+00 |
| 5 | −1.76E−03 | 5.55E−04 | −2.96E−04 | 0.00E+00 | 0.00E+00 |
| 6 | −7.14E−04 | 1.16E−04 | 3.39E−05 | 0.00E+00 | 0.00E+00 |
| 7 | −2.33E−04 | −4.64E−05 | 2.51E−05 | 0.00E+00 | 0.00E+00 |
| 8 | 8.01E−04 | −2.83E−04 | 1.97E−05 | 0.00E+00 | 0.00E+00 |
| 9 | 1.36E−03 | −2.35E−04 | 1.55E−05 | 0.00E+00 | 0.00E+00 |
| 10 | 6.24E−04 | −1.91E−04 | 1.83E−05 | 0.00E+00 | 0.00E+00 |
| 11 | −2.57E−04 | 6.98E−05 | −5.72E−06 | 0.00E+00 | 0.00E+00 |
| 12 | 3.28E−04 | −1.68E−05 | −7.24E−07 | 0.00E+00 | 0.00E+00 |
| 13 | −1.38E−04 | 2.67E−05 | −2.84E−06 | 0.00E+00 | 0.00E+00 |
| 14 | −4.12E−04 | 3.26E−04 | −2.63E−04 | 1.47E−04 | −3.10E−05 |
| 15 | 4.72E−03 | −3.18E−03 | 7.16E−05 | −2.80E−04 | 1.03E−04 |
| 16 | 7.44E−03 | −5.47E−03 | 4.68E−04 | 3.29E−04 | −3.43E−05 |
| 17 | 1.30E−02 | −4.97E−03 | 2.36E−03 | −2.23E−03 | 4.96E−04 |

In the example of FIG. 2A, the following optical properties are achieved:

TTL=8.34 mm

BFL=1.08 mm

EFL=4.14 mm $CA(S_{17}) > CA(S_k), 1 < k \leq 2N$ $CA(S_{16}) > CA(S_k), 1 < k \leq 2N - 1$ $CA(S_{15}) > CA(S_k), 1 < k < 2N - 2$ f/#=1.0

Sensor diagonal (SD) is 7 mm, sensor width/height ratio is 4:3

Minimum CA/SD ratio: $CA(S_4)/SD=0.57$

Maximum CA/SD ratio: $CA(S_{17})/SD=0.94$

Diagonal FOV=80.44 deg, Horizontal FOV=68.32 deg, Vertical FOV=53.48 deg,

Distance d from aperture stop to $S_2$: d=−0.042 mm $L_1$, $L_2$ and $L_3$ have relatively low power (magnitude), so $|f_i|>5 \cdot EFL$ for $1 \leq i \leq 3$ $L_4$ and $L_5$ together have positive power, so for the lens sub-system including $L_4$ and $L_5$ at a thickness d apart from each other and as given in Table 1 which has focal length $1/(f_4+f_5)=[1/f_4+1/f_5-d/(f_4 f_5)]>0$ For $L_5$ yields: $f_5<EFL$ $L_4$ and $L_5$ satisfy: $|f_4|<3\times f_5$ Minimal gap between $L_4$ and $L_5$: $Gap_{Min}=0.04$ mm Maximal gap between $L_4$ and $L_5$: $Gap_{Max}=0.0745$ mm Average gap $AVG_4$ between $L_4$ and $L_5$: $AVG_4=0.048$ mm $STD_4$ from average gap $AVG_4(r)$ between $L_4$ and $L_5$: $STD_4=3.42 \cdot 10^{-3}$ mm.

Lens 204 may be carried by a lens barrel having a lens barrel height of e.g. 6.57 mm-7.2 mm.

In this specification, a "gap" or an "air gap" refers to the space between consecutive lens elements. In the case of lens elements 4 and 5, "gap" refers to the air space between the last surface of $L_4$ and the first surface of $L_5$.

A number of functions and constants per gap are defined:

1. A "$Gap_i(r)$" function, (where i is the lens element number and r is the same variable used in Eq. 1) is:

a) for i=1: $Gap_1(r)=z(r)$ of $L_2S_1$+(the distance along the second optical axis between the prism exit surface and $L_2S_1$);

b) for i>1: $Gap_i(r)=z(r)$ of $L_{i+1}S_1$+(the distance along the second optical axis between $L_iS_2$ and $L_{i+1}S_1$)−z(r) of $L_iS_2$;

c) for r=0, an "on-axis gap" ($OA\_Gap_i$) is defined as $Gap_i(r=0)$;

2. A "gap average" (AVG$_i$) constant is given by:

$$AVG_i = \frac{1}{N+1/2} \sum_{j=0}^{N} Gap_i\left(\frac{j \cdot r_{norm}}{N}\right) \quad \text{(Eq. 2)}$$

where j is a discrete variable that runs from 0 to N, where N is an integer >10, and where $r_{norm}$ is the minimum value D/2 of surfaces {$L_iS_2$, $L_{i+1}S_1$}.

3. A normalized gap standard deviation (STD$_i$) constant is given by:

$$STD_i = \frac{1}{r_{norm}} \sqrt{\frac{1}{N-1/2} \sum_{j=0}^{N} \left(Gap_i\left(\frac{j \cdot r_{norm}}{N}\right) - AVG_i\right)^2} \quad \text{(Eq. 3)}$$

where $r_{norm}$ is the minimum value D/2 of surfaces {$L_iS_2$, $L_{i+1}S_1$}, N is an integer >10, and AVG$_i$ is defined as in (Eq.2).

Figure 2B:
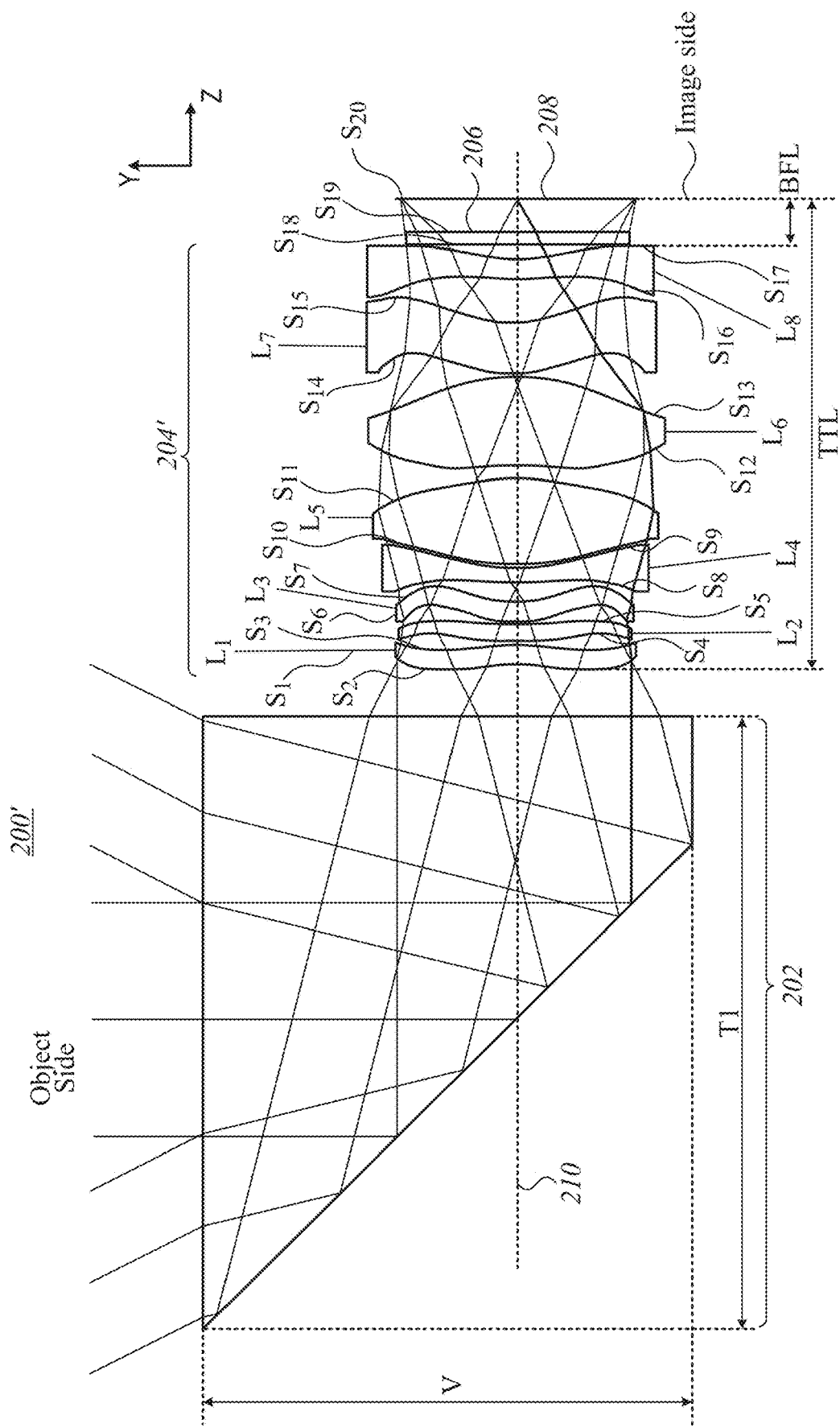
FIG. 2B shows a schematic view of another folded optical lens system according to some examples of the presently disclosed subject matter.

Attention is now drawn to FIG. 2B, which depicts schematically another optical lens system disclosed herein and numbered 200'. Lens system 200' comprises an OPFE 202, a lens 204' with a plurality of lens elements, an optical element 206 and an image sensor 208. Ray tracing is provided as in FIG. 2A. Detailed optical data and surface data are given in Tables 1 and 2. However, data on aperture radius for all surfaces of $L_6$ and $L_8$ as well as surface $S_{15}$ of $L_7$ is to be replaced by 2.5 mm in the y-direction (no change in x-direction).

For achieving a folded lens system with low f/# and low lens height at the same time, lens elements are cut to a non-circular shape (often called "cut lens" or "D cut lens"). The lens elements are obtained by cutting the large lens elements of lens 204' to a height of 5 mm (in the Y direction). That is, the lens elements $L_i$ of lens 204' that have height $H_{Li}$>5 mm (i.e. $L_6$, $L_7$ and $L_8$) are cut to 5 mm. The cut lens elements have no circular symmetry like that of lens elements 204, but their width is larger than their height, i.e. $W_{Li}$>$H_{Li}$ (see example in FIG. 7). The lens elements Li of lens 204 that have height $H_{Li}$≤5 mm are not changed. As of the cut, lens elements $L_6$, $L_7$ and $L_8$ have a large CA but still low CH. This is beneficial as in a folded lens design a lens height $H_L$ may determine the camera's height, wherein the camera height is generally limited by a height of the host device. A lens having large CA and low CH is beneficial for a low f/# folded lens that is compatible with e.g. a smartphone's height constraints. Lens elements of lens 204' are cut in direction Y, meaning that the height of a lens element $H_{Li}$ is smaller than its width $W_{Li}$. The CA of lens elements $L_1$-$L_5$ may be oriented in any direction, e.g. in Y direction. As of the cut design, the CA of lens element $L_6$, $L_7$ and $L_8$ is oriented in X direction (not shown here). In other embodiments, only one or only two lens elements $L_i$ may be cut, i.e. may have $W_{Li}$>$H_{Li}$. In yet other embodiments, more than 3 lens elements $L_i$ may be cut, i.e. may have $W_{Li}$>$H_{Li}$. In yet other embodiments, all lens elements $L_i$ may be cut, i.e. may have $W_{Li}$>$H_{Li}$. In other embodiments, lens 204' may be achieved by cutting the large lens elements of lens 204 to a height of e.g. 4.5 mm or 4 mm (in the Y direction), i.e. the lens elements $L_i$ that have height $H_{Li}$>4.5 mm (i.e. $L_4$, $L_5$, $L_6$, $L_7$ and $L_8$) or 4 mm (i.e. $L_1$-$L_8$) may be cut to 4.5 mm or 4 mm respectively. In yet other embodiments, lens 204' may formed by cutting the large lens elements of lens 204 to a height of e.g. 3.5 mm or 3 mm (in Y direction).

In lens system 200', the prism dimensions are identical with those in lens system 200: T1=10.93 mm, T2=12.6 mm and V=8.68 mm.

Besides the properties described in FIG. 2A, in the example of FIG. 2B, the following optical properties are achieved:

$CA(S_{12}) = 1.03 \times CH(S_{12}) = 2.58$ mm $CA(S_{13}) = 1.03 \times CH(S_{13}) = 2.58$ mm $CA(S_{15}) = 1.14 \times CH(S_{15}) = 2.85$ mm $CA(S_{16}) = 1.19 \times CH(S_{16}) = 2.97$ mm.

$CA(S_{17}) = 1.32 \times CH(S_{12}) = 3.29$ mm $CA(S_{17}) > CA(S_k), 1 < k \leq 2N$.

$CA(S_{16}) > CA(S_k), 1 < k \leq 2N - 1$ $CA(S_{15}) > CA(S_k), 1 < k < 2N - 2$ For all lens surfaces CH($S_k$)≤5 mm
f/#=1.0
Minimum CA/SD ratio: CA($S_4$)/SD=0.57
Maximum CA/SD ratio: CA($S_{17}$)/SD=0.71

Lens 204' may be carried by a lens barrel having a lens barrel height of e.g. 5.0 mm-5.5 mm.

Figure 2C:
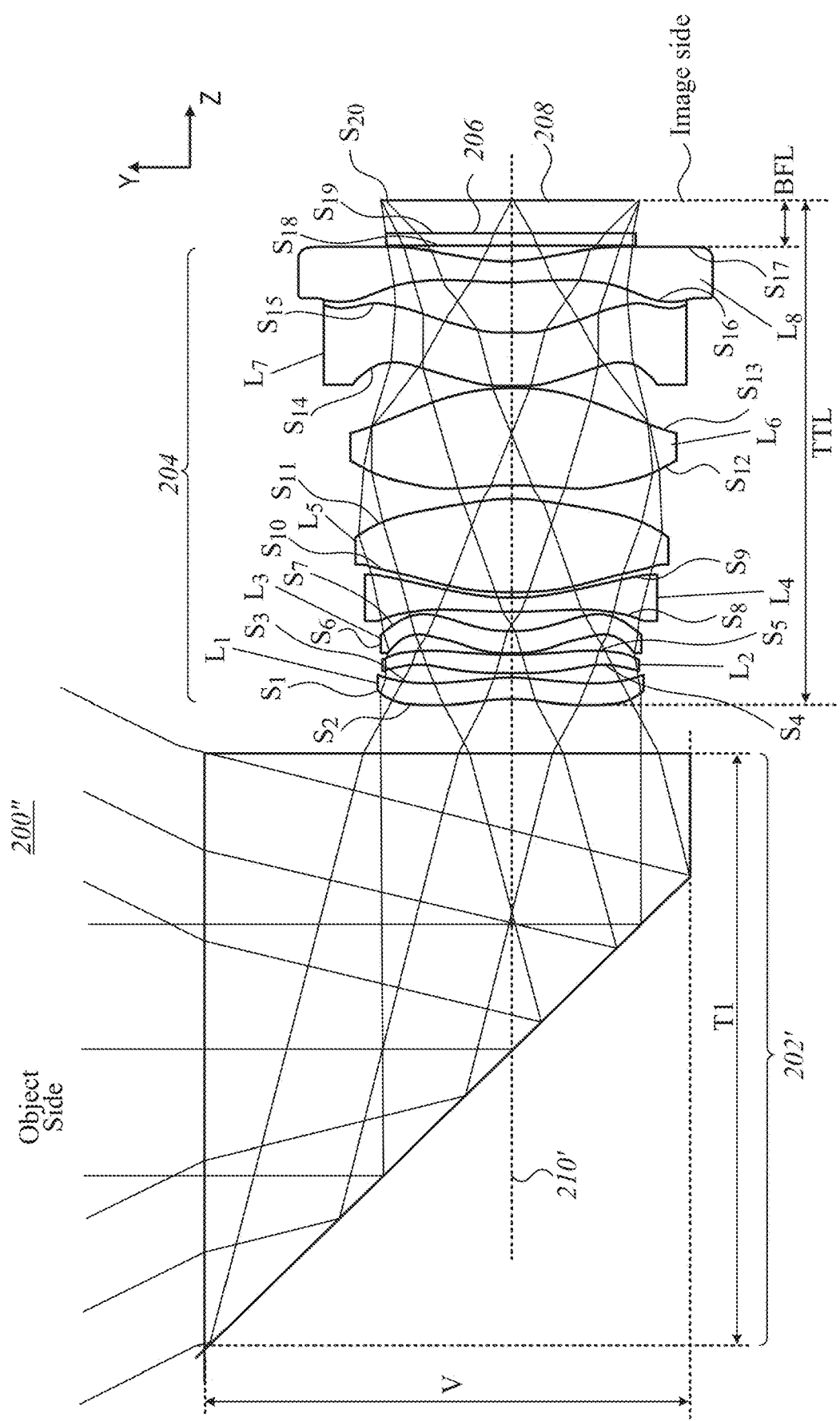
FIG. 2C shows a schematic view of yet another folded optical lens system according to some examples of the presently disclosed subject matter.

FIG. 2C depicts schematically another optical lens system disclosed herein and numbered 200". Lens system 200" comprises an OPFE 202', lens 204, an optical element 206 and image sensor 208. Ray tracing is provided as in FIG. 2A. Detailed optical data and surface data are given in Tables 1 and 2. In comparison with the OPFEs shown in FIG. 2A and FIG. 2B, OPFE 202' has a smaller prism height ("V") of 7.82 mm. The smaller prism height may be beneficial for achieving a slim folded camera.

Here T1=9.815 mm, T2=12.6 mm and V=7.82 mm. For the non-zero fields of lens system 200", the reduction of light compared to optical lens systems 200 and 200' is 8% or less. For the zero fields there is no change in the amount of light entering the camera. The high amount of light entering the camera allows for the camera's low f/# of 1.0. In other embodiments a f/# may be 0.8-1.2.

Figure 2D:
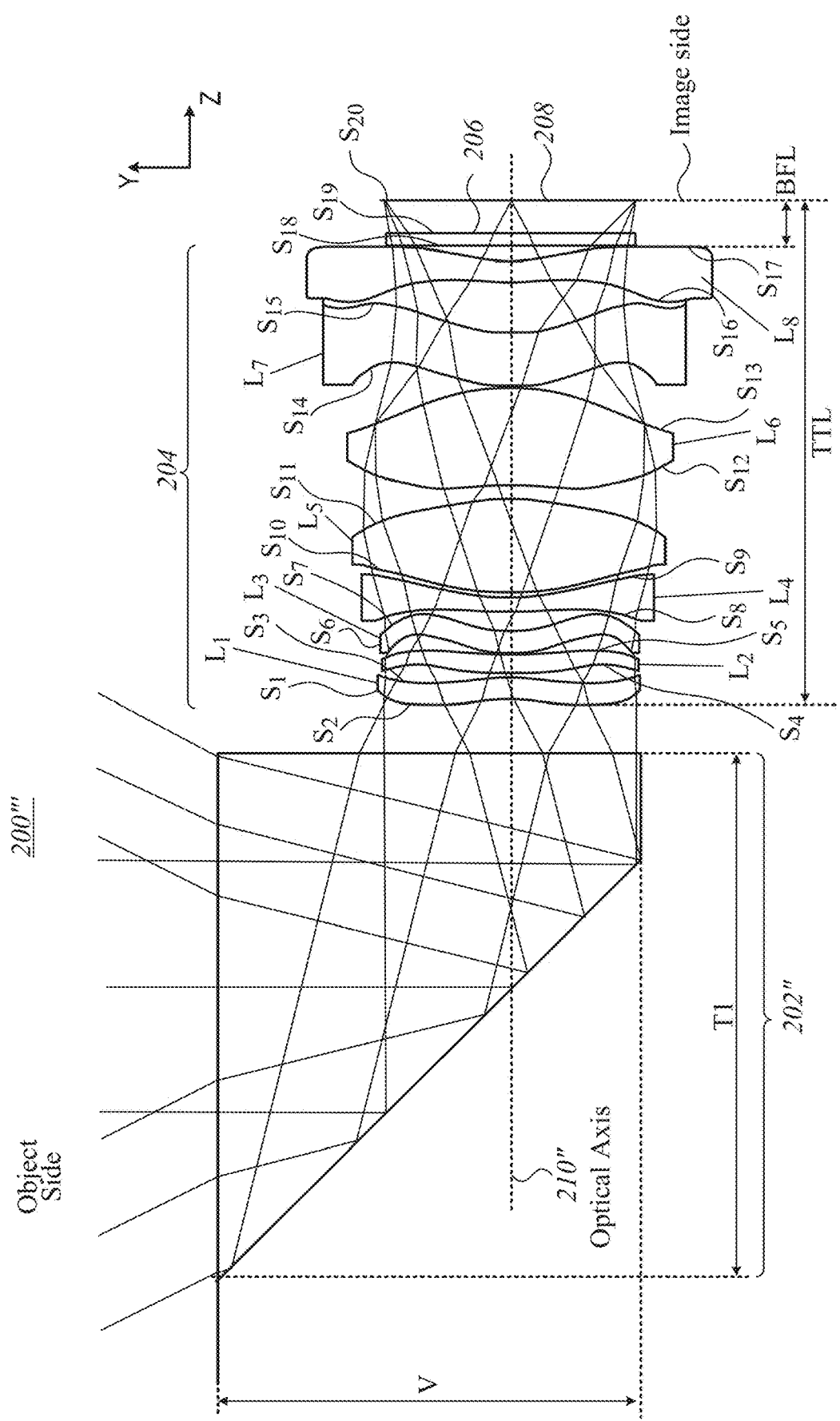
FIG. 2D shows a schematic view of yet another folded optical lens system according to some examples of the presently disclosed subject matter.

FIG. 2D depicts schematically yet another optical lens system disclosed herein and numbered 200'''. Lens system 200''' comprises an OPFE 202", lens 204, optical element 206 and image sensor 208. Ray tracing is provided as in FIG. 2A. Detailed optical data and surface data are given in Tables 1, 2. In comparison with OPFE 202' shown in FIG. 2C, OPFE 202" has a smaller prism height ("V") of 7.02 mm.

Here T1=8.75 mm, T2=12.6 mm and V=7.02 mm. For the non-zero fields of lens system 200''' the reduction of light compared to lens systems 200 and 200' is 19% or less. For the zero fields there is no change in the amount of light entering the camera. The high amount of light entering the camera allows for the camera's low f/# of 1.0. In other embodiments, f/# may be 0.8-1.2.

Figure 2E:
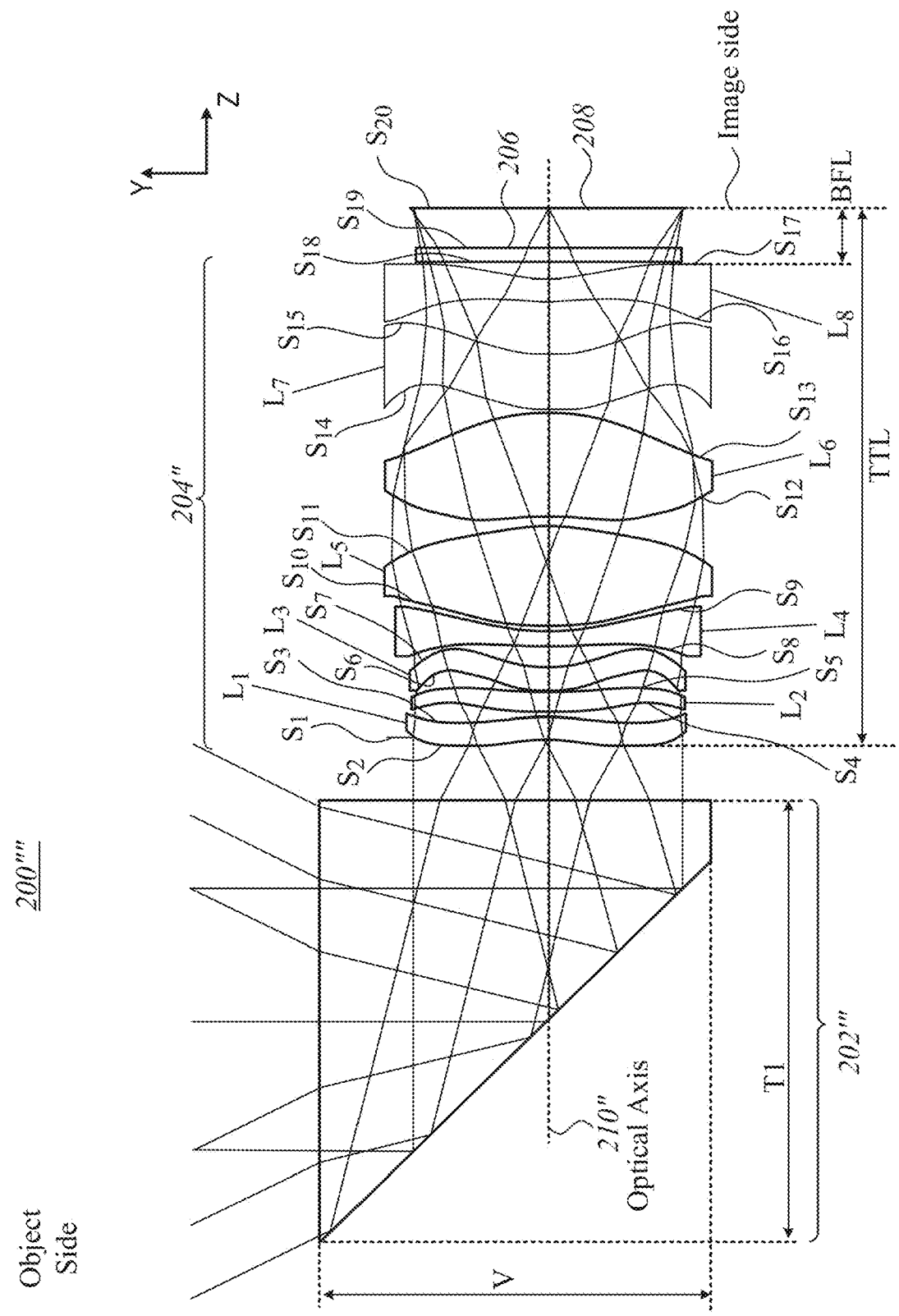
FIG. 2E depicts schematically yet another folded optical lens system disclosed herein.

FIG. 2E depicts schematically yet another optical lens system disclosed herein and numbered 200"". Lens system 200"" comprises an OPFE 202''', lens 204", optical element 206 and image sensor 208. Ray tracing is provided as in FIG. 2A. Detailed optical data and surface data are given in Tables 1, 2. However, data on aperture radius for all surfaces of $L_6$, and $L_5$ as well as of surfaces $S_{11}$ of $L_5$ and $S_{15}$ of $L_7$ is to be replaced by 2.45 mm in y-direction (no change in x-direction). The prism height (measured along the Y-axis) is larger than the height of lens 204". The height of the entire lens system 200"" (measured along the Y-axis) is determined solely by the prism height, i.e. there is no additional "height penalty" introduced by lens 204".

In comparison with OPFE 202" shown in FIG. 2D, OPFE 202'" has a smaller prism height of 6.00 mm.

The lens elements of lens 204" are obtained by cutting the large lens elements of lens 204" to a height of 4.9 mm (in Y direction). That is, the lens elements $L_i$ of lens 204" that have height $H_{Li}$>4.9 mm (i.e. $L_6$, $L_7$ and $L_8$) are cut to 4.9 mm. The cut lens elements have no circular symmetry like that of lens elements 204, but their width is larger than their height, i.e. $W_{Li}$>$H_{Li}$ (see example in FIG. 7). In other embodiments, lens 204" may be achieved by cutting the large lens elements of lens 204 to a height of e.g. 4.5 mm or 4 mm (in the Y direction), i.e. the lens elements $L_i$ that have height $H_{Li}$>4.5 mm (i.e. $L_4$, $L_5$, $L_6$, $L_7$ and $L_8$) or 4 mm (i.e. $L_1$-$L_8$) may be cut to 4.5 mm or 4 mm respectively.

Further explanation on cut lenses is provided in description of FIG. 2B. Here T1=6.95 mm, T2=12.6 mm and V=6.00 mm. For the non-zero fields shown in lens system 200"", about 55%-60% of light reaches image sensor 208. For the non-zero fields of lens system 200"" the reduction of light compared to the respective non-zero fields of lens systems 200 and 200' is about 30%. The light reduction is primarily caused by the smaller prism dimensions, not by the D cut of the larger lens elements. The light reduction occurs symmetrically for the upper marginal-ray and the lower marginal-ray. The difference in the amount of light that reaches image sensor 208 for the D cut lens in lens system 200"" and a non D cut lens amounts to <5%. For the zero fields there is no change in the amount of light entering the camera. The high amount of light entering the camera allows for the camera's low f/# of 1.0. In other embodiments, f/# may be 0.8-1.2. Lens 204" may be carried by a lens barrel having a lens barrel height of e.g. 4.9 mm-5.5 mm.

According to some examples, at least part of the lens elements can have a shape (profile) in cross-section (in plane X-Y, which is orthogonal to the optical lens system and which generally coincides with the optical axis) which is not circular. In particular, as shown e.g. in FIG. 7, at least some of the lens elements which are integrated in lens barrel 710 can have a width $W_{Li}$ (measured along axis X) which is greater than their height $H_{Li}$ (measured along axis Y). The height $H_{Li}$ can correspond to the total height of the lens element (including the mechanical part). In some embodiments, a lens element in lens system 700 may have a symmetry about axis Y and/or about axis X.

According to some examples, $W_{Li}$ is substantially greater than $H_{Li}$ (for example, by at least a percentage that is equal or greater than 20%, these values being not limiting). In some examples, $W_{Li}$ may be greater than $H_{Li}$ by a percentage of 20-70%. Consider lens element $L_8$ of folded lens 204' as an example: $W_{L8}$ is greater than $H_{L8}$ by a percentage of 32%. Another example is lens element $L_8$ of folded lens 204": $W_{L8}$ is greater than $H_{L8}$ by a percentage of 44%.

Unless otherwise stated, the use of the expression "and/or" between the last two members of a list of options for selection indicates that a selection of one or more of the listed options is appropriate and may be made.

It should be understood that where the claims or specification refer to "a" or "an" element, such reference is not to be construed as there being only one of that element.

All patents and patent applications mentioned in this specification are herein incorporated in their entirety by reference into the specification, to the same extent as if each individual patent or patent application was specifically and individually indicated to be incorporated herein by reference. In addition, citation or identification of any reference in this application shall not be construed as an admission that such reference is available as prior art to the present disclosure.

What is claimed is:

1. A folded camera, comprising: a lens having an effective focal length (EFL) and including N≥7 lens elements $L_i$ along a lens optical axis wherein a first lens element $L_1$ faces an object side, wherein each lens element Li has a respective front surface $S_{2i-1}$ and a respective rear surface $S_{2i}$, the lens element surfaces marked $S_k$ where 1≤k≤2N, wherein each lens element surface $S_k$ has a clear height value $CH(S_k)$ and a clear aperture value $CA(S_k)$, and wherein a clear aperture value $CA(S_{2N})$ in lens element $L_N$ is greater than a clear aperture value $CA(S_1)$ in lens element $L_1$;
   an image sensor; and
   an optical path folding element (OPFE) for folding a first optical path to a second optical path that is perpendicular to the first optical path and parallel to the lens optical axis, wherein one or more of the lens elements are cut lens elements that have a respective width $W_{Li}$ measured along an axis perpendicular to both the first optical path and the second optical path, and a respective height $H_{Li}$ measured along an axis parallel to the first optical path, wherein $W_{Li}$>$H_{Li}$, wherein the camera has an f number f/#<1.1, and
   wherein the folded camera is a wide camera with a field of view (FOV) ranging from 60 degrees to 90 degrees.

2. The folded camera of claim 1, wherein f/#≤1.0.

3. The folded camera of claim 1, wherein in at least one of the cut lens elements $W_{Li}/H_{Li}$>1.1.

4. The folded camera of claim 1, wherein in at least one of the cut lens elements $W_{Li}/H_{Li}$>1.2.

5. The folded camera of claim 1, wherein a clear height value of all lens elements is smaller than or equal to 5 mm.

6. The folded camera of claim 5, wherein the lens is included in a lens barrel, wherein the lens barrel has a lens barrel height measured along the first optical path, and wherein the lens barrel height is smaller than or equal to 5.5 mm.

7. The folded camera of claim 1, wherein the camera has a diagonal field of view (FOV) larger than 60 degrees.

8. The folded camera of claim 1, wherein the image sensor lies in a plane that is parallel to the first optical path.

9. The folded camera of claim 1, wherein the folded camera has a total track length (TTL), and wherein an aperture stop of the lens is located closer to a first surface $S_1$ of lens $L_1$ than a distance d that fulfills d/TTL=0.2.

10. The folded camera of claim 1, wherein the image sensor has a sensor diagonal SD>6 mm.

11. The folded camera of claim 1, wherein the OPFE has a height $H_O$, wherein the lens has a height $H_L$, wherein $H_O$ and $H_L$ are measured along a direction parallel to the first optical path, and wherein $H_O$>$H_L$.

12. The folded camera of claim 6, wherein the OPFE has a height $H_O$, wherein the lens barrel has a height $H_{LB}$, wherein $H_O$ and $H_{LB}$ are measured along a direction parallel to the first optical path, and wherein $H_O$>$H_{LB}$.

13. The folded camera of claim 1, wherein the camera has a height $H_C$ and the OPFE has a height $H_O$, wherein $H_O$ and $H_C$ are measured along a direction parallel to the first optical path, and wherein $H_C$ is determined by $H_O$.

14. The folded camera of claim 1, wherein an absolute value of an optical power of element $L_i|f_i|$>5×EFL for 1≤i≤3.

15. The folded camera of claim 1, wherein lens element $L_5$ has a strongest optical power of all lens elements $|f_5|<|f_i|$ for $i \neq 5$.

16. The folded camera of claim 1, wherein STD is a normalized air gap standard deviation of an air gap between two consecutive lens elements, and wherein the lens includes at least one air gap between lens elements that complies with the condition STD<0.020.

17. The folded camera of claim 1, wherein the folded camera is included in a mobile device.

18. The folded camera of claim 17, wherein the mobile device is a smartphone.

\* \* \* \* \*